(12) United States Patent
Antonio et al.

(10) Patent No.: US 6,714,597 B1
(45) Date of Patent: Mar. 30, 2004

(54) SYSTEM AND METHOD FOR REDUCING INTERFERENCE GENERATED BY A CDMA COMMUNICATIONS DEVICE

(75) Inventors: Franklin Antonio, Del Mar, CA (US); Robert D. Blakeney, II, Steamboat Springs, CO (US); Klein S. Gilhousen, Bozeman, MT (US); Roy F. Quick, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 200 days.

(21) Appl. No.: 09/654,179

(22) Filed: Sep. 1, 2000

Related U.S. Application Data

(63) Continuation of application No. 08/639,572, filed on Apr. 29, 1996, now Pat. No. 6,205,190.

(51) Int. Cl.[7] ................................ H04L 25/49
(52) U.S. Cl. .................... 375/296; 455/522; 370/311
(58) Field of Search ...................... 375/295, 296, 375/278, 284, 285, 254, 144; 455/522, 69, 88, 501, 127.1

(56) References Cited

U.S. PATENT DOCUMENTS

| | | | |
|---|---|---|---|
| 5,103,459 A | 4/1992 | Gilhousen et al. | 375/1 |
| 5,128,965 A | 7/1992 | Henriksson | 375/58 |
| 5,247,704 A | 9/1993 | Greenwood | 455/73 |
| 5,267,262 A | 11/1993 | Wheatley, III | 375/1 |
| 5,309,474 A | 5/1994 | Gilhousen et al. | 375/1 |
| 5,416,797 A | 5/1995 | Gilhousen et al. | 375/705 |
| 5,515,375 A | 5/1996 | DeClerck | 370/84 |
| 5,535,239 A | 7/1996 | Padovani et al. | 375/205 |
| 5,623,486 A | 4/1997 | Dohi et al. | 370/342 |
| 5,629,934 A | 5/1997 | Ghosh et al. | 370/335 |
| 5,657,420 A | 8/1997 | Jacobs et al. | 395/2.32 |
| 5,659,569 A * | 8/1997 | Padovani et al. | 370/479 |
| 5,671,219 A | 9/1997 | Jensen et al. | 370/280 |
| 5,857,147 A | 1/1999 | Gardner et al. | 455/67.1 |
| 6,005,855 A * | 12/1999 | Zehavi et al. | 370/335 |

FOREIGN PATENT DOCUMENTS

| | | |
|---|---|---|
| EP | 0405783 | 1/1991 |
| EP | 0632609 | 1/1995 |
| WO | 9314588 | 7/1993 |

OTHER PUBLICATIONS

Brummen im Ohr–GSM–Handys und Horgerate Funkschau 67(25): 60–61 (Nov. 1995).

* cited by examiner

Primary Examiner—Stephen Chin
Assistant Examiner—Kevin Kim
(74) Attorney, Agent, or Firm—Philip Wadsworth; Kent Baker; Sandra L. Godsey

(57) ABSTRACT

A system and method for reducing the interference experienced by sensitive electronic devices, such as hearing aids, operative in the vicinity of CDMA user communication devices. A transmitter of the communications device is configured to transmit signal power substantially continuously at a full rate power level irrespective of the variable data rate at which the transmitter would otherwise be operative. In a first embodiment, a variable rate vocoder within the transmitter is directed to perform full-rate vocoding, irrespective of an instantaneous level of user speech. In a second embodiment, a microprocessor builds full-rate frames using repeated versions of code symbols generated by the vocoder. In a third embodiment, the microprocessor builds full rate frames by generating signaling bits of a predetermined pattern to pad otherwise non-full frames.

41 Claims, 20 Drawing Sheets

PRIMARY TRAFFIC ONLY (9.6 KBPS)

DIM AND BURST WITH RATE 1/2 PRIMARY AND SIGNALING TRAFFIC (9.6 KBPS)

DIM AND BURST WITH RATE 1/4 PRIMARY AND SIGNALING TRAFFIC (9.6 KBPS)

DIM AND BURST WITH RATE 1/8 PRIMARY AND SIGNALING TRAFFIC (9.6 KBPS)

BLANK AND BURST WITH SIGNALING TRAFFIC ONLY (9.6 KBPS)

4.8 KBPS FRAME FORMAT 2.4 KBPS FRAME FORMAT 1.2 KBPS FRAME FORMAT

| | | | | | | | | | | | | | | | | | |
|---|---|---|---|---|---|---|---|---|---|---|---|---|---|---|---|---|---|
| 1 | 33 | 65 | 97 | 129 | 161 | 193 | 225 | 257 | 289 | 321 | 353 | 385 | 417 | 449 | 481 | 513 | 545 |
| 2 | 34 | 66 | 98 | 130 | 162 | 194 | 226 | 258 | 290 | 322 | 354 | 386 | 418 | 450 | 482 | 514 | 546 |
| 3 | 35 | 67 | 99 | 131 | 163 | 195 | 227 | 259 | 291 | 323 | 355 | 387 | 419 | 451 | 483 | 515 | 547 |
| 4 | 36 | 68 | 100 | 132 | 164 | 196 | 228 | 260 | 292 | 324 | 356 | 388 | 420 | 452 | 484 | 516 | 548 |
| 5 | 37 | 69 | 101 | 133 | 165 | 197 | 229 | 261 | 293 | 325 | 357 | 389 | 421 | 453 | 485 | 517 | 549 |
| 6 | 38 | 70 | 102 | 134 | 166 | 198 | 230 | 262 | 294 | 326 | 358 | 390 | 422 | 454 | 486 | 518 | 550 |
| 7 | 39 | 71 | 103 | 135 | 167 | 199 | 231 | 263 | 295 | 327 | 359 | 391 | 423 | 455 | 487 | 519 | 551 |
| 8 | 40 | 72 | 104 | 136 | 168 | 200 | 232 | 264 | 296 | 328 | 360 | 392 | 424 | 456 | 488 | 520 | 552 |
| 9 | 41 | 73 | 105 | 137 | 169 | 201 | 233 | 265 | 297 | 329 | 361 | 393 | 425 | 457 | 489 | 521 | 553 |
| 10 | 42 | 74 | 106 | 138 | 170 | 202 | 234 | 266 | 298 | 330 | 362 | 394 | 426 | 458 | 490 | 522 | 554 |
| 11 | 43 | 75 | 107 | 139 | 171 | 203 | 235 | 267 | 299 | 331 | 363 | 395 | 427 | 459 | 491 | 523 | 555 |
| 12 | 44 | 76 | 108 | 140 | 172 | 204 | 236 | 268 | 300 | 332 | 364 | 396 | 428 | 460 | 492 | 524 | 556 |
| 13 | 45 | 77 | 109 | 141 | 173 | 205 | 237 | 269 | 301 | 333 | 365 | 397 | 429 | 461 | 493 | 525 | 557 |
| 14 | 46 | 78 | 110 | 142 | 174 | 206 | 238 | 270 | 302 | 334 | 366 | 398 | 430 | 462 | 494 | 526 | 558 |
| 15 | 47 | 79 | 111 | 143 | 175 | 207 | 239 | 271 | 303 | 335 | 367 | 399 | 431 | 463 | 495 | 527 | 559 |
| 16 | 48 | 80 | 112 | 144 | 176 | 208 | 240 | 272 | 304 | 336 | 368 | 400 | 432 | 464 | 496 | 528 | 560 |
| 17 | 49 | 81 | 113 | 145 | 177 | 209 | 241 | 273 | 305 | 337 | 369 | 401 | 433 | 465 | 497 | 529 | 561 |
| 18 | 50 | 82 | 114 | 146 | 178 | 210 | 242 | 274 | 306 | 338 | 370 | 402 | 434 | 466 | 498 | 530 | 562 |
| 19 | 51 | 83 | 115 | 147 | 179 | 211 | 243 | 275 | 307 | 339 | 371 | 403 | 435 | 467 | 499 | 531 | 563 |
| 20 | 52 | 84 | 116 | 148 | 180 | 212 | 244 | 276 | 308 | 340 | 372 | 404 | 436 | 468 | 500 | 532 | 564 |
| 21 | 53 | 85 | 117 | 149 | 181 | 213 | 245 | 277 | 309 | 341 | 373 | 405 | 437 | 469 | 501 | 533 | 565 |
| 22 | 54 | 86 | 118 | 150 | 182 | 214 | 246 | 278 | 310 | 342 | 374 | 406 | 438 | 470 | 502 | 534 | 566 |
| 23 | 55 | 87 | 119 | 151 | 183 | 215 | 247 | 279 | 311 | 343 | 375 | 407 | 439 | 471 | 503 | 535 | 567 |
| 24 | 56 | 88 | 120 | 152 | 184 | 216 | 248 | 280 | 312 | 344 | 376 | 408 | 440 | 472 | 504 | 536 | 568 |
| 25 | 57 | 89 | 121 | 153 | 185 | 217 | 249 | 281 | 313 | 345 | 377 | 409 | 441 | 473 | 505 | 537 | 569 |
| 26 | 58 | 90 | 122 | 154 | 186 | 218 | 250 | 282 | 314 | 346 | 378 | 410 | 442 | 474 | 506 | 538 | 570 |
| 27 | 59 | 91 | 123 | 155 | 187 | 219 | 251 | 283 | 315 | 347 | 379 | 411 | 443 | 475 | 507 | 539 | 571 |
| 28 | 60 | 92 | 124 | 156 | 188 | 220 | 252 | 284 | 316 | 348 | 380 | 412 | 444 | 476 | 508 | 540 | 572 |
| 29 | 61 | 93 | 125 | 157 | 189 | 221 | 253 | 285 | 317 | 349 | 381 | 413 | 445 | 477 | 509 | 541 | 573 |
| 30 | 62 | 94 | 126 | 158 | 190 | 222 | 254 | 286 | 318 | 350 | 382 | 414 | 446 | 478 | 510 | 542 | 574 |
| 31 | 63 | 95 | 127 | 159 | 191 | 223 | 255 | 287 | 319 | 351 | 383 | 415 | 447 | 479 | 511 | 543 | 575 |
| 32 | 64 | 96 | 128 | 160 | 192 | 224 | 256 | 288 | 320 | 352 | 384 | 416 | 448 | 480 | 512 | 544 | 576 |

FIG. 5A

| | | | | | | | | | | | | | | | | | |
|---|---|---|---|---|---|---|---|---|---|---|---|---|---|---|---|---|---|
| 1 | 17 | 33 | 49 | 65 | 81 | 97 | 113 | 129 | 145 | 161 | 177 | 193 | 209 | 225 | 241 | 257 | 273 |
| 1 | 17 | 33 | 49 | 65 | 81 | 97 | 113 | 129 | 145 | 161 | 177 | 193 | 209 | 225 | 241 | 257 | 273 |
| 2 | 18 | 34 | 50 | 66 | 82 | 98 | 114 | 130 | 146 | 162 | 178 | 194 | 210 | 226 | 242 | 258 | 274 |
| 2 | 18 | 34 | 50 | 66 | 82 | 98 | 114 | 130 | 146 | 162 | 178 | 194 | 210 | 226 | 242 | 258 | 274 |
| 3 | 19 | 35 | 51 | 67 | 83 | 99 | 115 | 131 | 147 | 163 | 179 | 195 | 211 | 227 | 243 | 259 | 275 |
| 3 | 19 | 35 | 51 | 67 | 83 | 99 | 115 | 131 | 147 | 163 | 179 | 195 | 211 | 227 | 243 | 259 | 275 |
| 4 | 20 | 36 | 52 | 68 | 84 | 100 | 116 | 132 | 148 | 164 | 180 | 196 | 212 | 228 | 244 | 260 | 276 |
| 4 | 20 | 36 | 52 | 68 | 84 | 100 | 116 | 132 | 148 | 164 | 180 | 196 | 212 | 228 | 244 | 260 | 276 |
| 5 | 21 | 37 | 53 | 69 | 85 | 101 | 117 | 133 | 149 | 165 | 181 | 197 | 213 | 229 | 245 | 261 | 277 |
| 5 | 21 | 37 | 53 | 69 | 85 | 101 | 117 | 133 | 149 | 165 | 181 | 197 | 213 | 229 | 245 | 261 | 277 |
| 6 | 22 | 38 | 54 | 70 | 86 | 102 | 118 | 134 | 150 | 166 | 182 | 198 | 214 | 230 | 246 | 262 | 278 |
| 6 | 22 | 38 | 54 | 70 | 86 | 102 | 118 | 134 | 150 | 166 | 182 | 198 | 214 | 230 | 246 | 262 | 278 |
| 7 | 23 | 39 | 55 | 71 | 87 | 103 | 119 | 135 | 151 | 167 | 183 | 199 | 215 | 231 | 247 | 263 | 279 |
| 7 | 23 | 39 | 55 | 71 | 87 | 103 | 119 | 135 | 151 | 167 | 183 | 199 | 215 | 231 | 247 | 263 | 279 |
| 8 | 24 | 40 | 56 | 72 | 88 | 104 | 120 | 136 | 152 | 168 | 184 | 200 | 216 | 232 | 248 | 264 | 280 |
| 8 | 24 | 40 | 56 | 72 | 88 | 104 | 120 | 136 | 152 | 168 | 184 | 200 | 216 | 232 | 248 | 264 | 280 |
| 9 | 25 | 41 | 57 | 73 | 89 | 105 | 121 | 137 | 153 | 169 | 185 | 201 | 217 | 233 | 249 | 265 | 281 |
| 9 | 25 | 41 | 57 | 73 | 89 | 105 | 121 | 137 | 153 | 169 | 185 | 201 | 217 | 233 | 249 | 265 | 281 |
| 10 | 26 | 42 | 58 | 74 | 90 | 106 | 122 | 138 | 154 | 170 | 186 | 202 | 218 | 234 | 250 | 266 | 282 |
| 10 | 26 | 42 | 58 | 74 | 90 | 106 | 122 | 138 | 154 | 170 | 186 | 202 | 218 | 234 | 250 | 266 | 282 |
| 11 | 27 | 43 | 59 | 75 | 91 | 107 | 123 | 139 | 155 | 171 | 187 | 203 | 219 | 235 | 251 | 267 | 283 |
| 11 | 27 | 43 | 59 | 75 | 91 | 107 | 123 | 139 | 155 | 171 | 187 | 203 | 219 | 235 | 251 | 267 | 283 |
| 12 | 28 | 44 | 60 | 76 | 92 | 108 | 124 | 140 | 156 | 172 | 188 | 204 | 220 | 236 | 252 | 268 | 284 |
| 12 | 28 | 44 | 60 | 76 | 92 | 108 | 124 | 140 | 156 | 172 | 188 | 204 | 220 | 236 | 252 | 268 | 284 |
| 13 | 29 | 45 | 61 | 77 | 93 | 109 | 125 | 141 | 157 | 173 | 189 | 205 | 221 | 237 | 253 | 269 | 285 |
| 13 | 29 | 45 | 61 | 77 | 93 | 109 | 125 | 141 | 157 | 173 | 189 | 205 | 221 | 237 | 253 | 269 | 285 |
| 14 | 30 | 46 | 62 | 78 | 94 | 110 | 126 | 142 | 158 | 174 | 190 | 206 | 222 | 238 | 254 | 270 | 286 |
| 14 | 30 | 46 | 62 | 78 | 94 | 110 | 126 | 142 | 158 | 174 | 190 | 206 | 222 | 238 | 254 | 270 | 286 |
| 15 | 31 | 47 | 63 | 79 | 95 | 111 | 127 | 143 | 159 | 175 | 191 | 207 | 223 | 239 | 255 | 271 | 287 |
| 15 | 31 | 47 | 63 | 79 | 95 | 111 | 127 | 143 | 159 | 175 | 191 | 207 | 223 | 239 | 255 | 271 | 287 |
| 16 | 32 | 48 | 64 | 80 | 96 | 112 | 128 | 144 | 160 | 176 | 192 | 208 | 224 | 240 | 256 | 272 | 288 |
| 16 | 32 | 48 | 64 | 80 | 96 | 112 | 128 | 144 | 160 | 176 | 192 | 208 | 224 | 240 | 256 | 272 | 288 |

FIG. 5B

| | | | | | | | | | | | | | | | | | |
|---|---|---|---|---|---|---|---|---|---|---|---|---|---|---|---|---|---|
| 1 | 9 | 17 | 25 | 33 | 41 | 49 | 57 | 65 | 73 | 81 | 89 | 97 | 105 | 113 | 121 | 129 | 137 |
| 1 | 9 | 17 | 25 | 33 | 41 | 49 | 57 | 65 | 73 | 81 | 89 | 97 | 105 | 113 | 121 | 129 | 137 |
| 1 | 9 | 17 | 25 | 33 | 41 | 49 | 57 | 65 | 73 | 81 | 89 | 97 | 105 | 113 | 121 | 129 | 137 |
| 1 | 9 | 17 | 25 | 33 | 41 | 49 | 57 | 65 | 73 | 81 | 89 | 97 | 105 | 113 | 121 | 129 | 137 |
| 2 | 10 | 18 | 26 | 34 | 42 | 50 | 58 | 66 | 74 | 82 | 90 | 98 | 106 | 114 | 122 | 130 | 138 |
| 2 | 10 | 18 | 26 | 34 | 42 | 50 | 58 | 66 | 74 | 82 | 90 | 98 | 106 | 114 | 122 | 130 | 138 |
| 2 | 10 | 18 | 26 | 34 | 42 | 50 | 58 | 66 | 74 | 82 | 90 | 98 | 106 | 114 | 122 | 130 | 138 |
| 2 | 10 | 18 | 26 | 34 | 42 | 50 | 58 | 66 | 74 | 82 | 90 | 98 | 106 | 114 | 122 | 130 | 138 |
| 3 | 11 | 19 | 27 | 35 | 43 | 51 | 59 | 67 | 75 | 83 | 91 | 99 | 107 | 115 | 123 | 131 | 139 |
| 3 | 11 | 19 | 27 | 35 | 43 | 51 | 59 | 67 | 75 | 83 | 91 | 99 | 107 | 115 | 123 | 131 | 139 |
| 3 | 11 | 19 | 27 | 35 | 43 | 51 | 59 | 67 | 75 | 83 | 91 | 99 | 107 | 115 | 123 | 131 | 139 |
| 3 | 11 | 19 | 27 | 35 | 43 | 51 | 59 | 67 | 75 | 83 | 91 | 99 | 107 | 115 | 123 | 131 | 139 |
| 4 | 12 | 20 | 28 | 36 | 44 | 52 | 60 | 68 | 76 | 84 | 92 | 100 | 108 | 116 | 124 | 132 | 140 |
| 4 | 12 | 20 | 28 | 36 | 44 | 52 | 60 | 68 | 76 | 84 | 92 | 100 | 108 | 116 | 124 | 132 | 140 |
| 4 | 12 | 20 | 28 | 36 | 44 | 52 | 60 | 68 | 76 | 84 | 92 | 100 | 108 | 116 | 124 | 132 | 140 |
| 4 | 12 | 20 | 28 | 36 | 44 | 52 | 60 | 68 | 76 | 84 | 92 | 100 | 108 | 116 | 124 | 132 | 140 |
| 5 | 13 | 21 | 29 | 37 | 45 | 53 | 61 | 69 | 77 | 85 | 93 | 101 | 109 | 117 | 125 | 133 | 141 |
| 5 | 13 | 21 | 29 | 37 | 45 | 53 | 61 | 69 | 77 | 85 | 93 | 101 | 109 | 117 | 125 | 133 | 141 |
| 5 | 13 | 21 | 29 | 37 | 45 | 53 | 61 | 69 | 77 | 85 | 93 | 101 | 109 | 117 | 125 | 133 | 141 |
| 5 | 13 | 21 | 29 | 37 | 45 | 53 | 61 | 69 | 77 | 85 | 93 | 101 | 109 | 117 | 125 | 133 | 141 |
| 6 | 14 | 22 | 30 | 38 | 46 | 54 | 62 | 70 | 78 | 86 | 94 | 102 | 110 | 118 | 126 | 134 | 142 |
| 6 | 14 | 22 | 30 | 38 | 46 | 54 | 62 | 70 | 78 | 86 | 94 | 102 | 110 | 118 | 126 | 134 | 142 |
| 6 | 14 | 22 | 30 | 38 | 46 | 54 | 62 | 70 | 78 | 86 | 94 | 102 | 110 | 118 | 126 | 134 | 142 |
| 6 | 14 | 22 | 30 | 38 | 46 | 54 | 62 | 70 | 78 | 86 | 94 | 102 | 110 | 118 | 126 | 134 | 142 |
| 7 | 15 | 23 | 31 | 39 | 47 | 55 | 63 | 71 | 79 | 87 | 95 | 103 | 111 | 119 | 127 | 135 | 143 |
| 7 | 15 | 23 | 31 | 39 | 47 | 55 | 63 | 71 | 79 | 87 | 95 | 103 | 111 | 119 | 127 | 135 | 143 |
| 7 | 15 | 23 | 31 | 39 | 47 | 55 | 63 | 71 | 79 | 87 | 95 | 103 | 111 | 119 | 127 | 135 | 143 |
| 7 | 15 | 23 | 31 | 39 | 47 | 55 | 63 | 71 | 79 | 87 | 95 | 103 | 111 | 119 | 127 | 135 | 143 |
| 8 | 16 | 24 | 32 | 40 | 48 | 56 | 64 | 72 | 80 | 88 | 96 | 104 | 112 | 120 | 128 | 136 | 144 |
| 8 | 16 | 24 | 32 | 40 | 48 | 56 | 64 | 72 | 80 | 88 | 96 | 104 | 112 | 120 | 128 | 136 | 144 |
| 8 | 16 | 24 | 32 | 40 | 48 | 56 | 64 | 72 | 80 | 88 | 96 | 104 | 112 | 120 | 128 | 136 | 144 |
| 8 | 16 | 24 | 32 | 40 | 48 | 56 | 64 | 72 | 80 | 88 | 96 | 104 | 112 | 120 | 128 | 136 | 144 |

FIG. 5C

| | | | | | | | | | | | | | | | | | |
|---|---|---|---|---|---|---|---|---|---|---|---|---|---|---|---|---|---|
| 1 | 5 | 9 | 13 | 17 | 21 | 25 | 29 | 33 | 37 | 41 | 45 | 49 | 53 | 57 | 61 | 65 | 69 |
| 1 | 5 | 9 | 13 | 17 | 21 | 25 | 29 | 33 | 37 | 41 | 45 | 49 | 53 | 57 | 61 | 65 | 69 |
| 1 | 5 | 9 | 13 | 17 | 21 | 25 | 29 | 33 | 37 | 41 | 45 | 49 | 53 | 57 | 61 | 65 | 69 |
| 1 | 5 | 9 | 13 | 17 | 21 | 25 | 29 | 33 | 37 | 41 | 45 | 49 | 53 | 57 | 61 | 65 | 69 |
| 1 | 5 | 9 | 13 | 17 | 21 | 25 | 29 | 33 | 37 | 41 | 45 | 49 | 53 | 57 | 61 | 65 | 69 |
| 1 | 5 | 9 | 13 | 17 | 21 | 25 | 29 | 33 | 37 | 41 | 45 | 49 | 53 | 57 | 61 | 65 | 69 |
| 1 | 5 | 9 | 13 | 17 | 21 | 25 | 29 | 33 | 37 | 41 | 45 | 49 | 53 | 57 | 61 | 65 | 69 |
| 1 | 5 | 9 | 13 | 17 | 21 | 25 | 29 | 33 | 37 | 41 | 45 | 49 | 53 | 57 | 61 | 65 | 69 |
| 2 | 6 | 10 | 14 | 18 | 22 | 26 | 30 | 34 | 38 | 42 | 46 | 50 | 54 | 58 | 62 | 66 | 70 |
| 2 | 6 | 10 | 14 | 18 | 22 | 26 | 30 | 34 | 38 | 42 | 46 | 50 | 54 | 58 | 62 | 66 | 70 |
| 2 | 6 | 10 | 14 | 18 | 22 | 26 | 30 | 34 | 38 | 42 | 46 | 50 | 54 | 58 | 62 | 66 | 70 |
| 2 | 6 | 10 | 14 | 18 | 22 | 26 | 30 | 34 | 38 | 42 | 46 | 50 | 54 | 58 | 62 | 66 | 70 |
| 2 | 6 | 10 | 14 | 18 | 22 | 26 | 30 | 34 | 38 | 42 | 46 | 50 | 54 | 58 | 62 | 66 | 70 |
| 2 | 6 | 10 | 14 | 18 | 22 | 26 | 30 | 34 | 38 | 42 | 46 | 50 | 54 | 58 | 62 | 66 | 70 |
| 2 | 6 | 10 | 14 | 18 | 22 | 26 | 30 | 34 | 38 | 42 | 46 | 50 | 54 | 58 | 62 | 66 | 70 |
| 2 | 6 | 10 | 14 | 18 | 22 | 26 | 30 | 34 | 38 | 42 | 46 | 50 | 54 | 58 | 62 | 66 | 70 |
| 3 | 7 | 11 | 15 | 19 | 23 | 27 | 31 | 35 | 39 | 43 | 47 | 51 | 55 | 59 | 63 | 67 | 71 |
| 3 | 7 | 11 | 15 | 19 | 23 | 27 | 31 | 35 | 39 | 43 | 47 | 51 | 55 | 59 | 63 | 67 | 71 |
| 3 | 7 | 11 | 15 | 19 | 23 | 27 | 31 | 35 | 39 | 43 | 47 | 51 | 55 | 59 | 63 | 67 | 71 |
| 3 | 7 | 11 | 15 | 19 | 23 | 27 | 31 | 35 | 39 | 43 | 47 | 51 | 55 | 59 | 63 | 67 | 71 |
| 3 | 7 | 11 | 15 | 19 | 23 | 27 | 31 | 35 | 39 | 43 | 47 | 51 | 55 | 59 | 63 | 67 | 71 |
| 3 | 7 | 11 | 15 | 19 | 23 | 27 | 31 | 35 | 39 | 43 | 47 | 51 | 55 | 59 | 63 | 67 | 71 |
| 3 | 7 | 11 | 15 | 19 | 23 | 27 | 31 | 35 | 39 | 43 | 47 | 51 | 55 | 59 | 63 | 67 | 71 |
| 3 | 7 | 11 | 15 | 19 | 23 | 27 | 31 | 35 | 39 | 43 | 47 | 51 | 55 | 59 | 63 | 67 | 71 |
| 4 | 8 | 12 | 16 | 20 | 24 | 28 | 32 | 36 | 40 | 44 | 48 | 52 | 56 | 60 | 64 | 68 | 72 |
| 4 | 8 | 12 | 16 | 20 | 24 | 28 | 32 | 36 | 40 | 44 | 48 | 52 | 56 | 60 | 64 | 68 | 72 |
| 4 | 8 | 12 | 16 | 20 | 24 | 28 | 32 | 36 | 40 | 44 | 48 | 52 | 56 | 60 | 64 | 68 | 72 |
| 4 | 8 | 12 | 16 | 20 | 24 | 28 | 32 | 36 | 40 | 44 | 48 | 52 | 56 | 60 | 64 | 68 | 72 |
| 4 | 8 | 12 | 16 | 20 | 24 | 28 | 32 | 36 | 40 | 44 | 48 | 52 | 56 | 60 | 64 | 68 | 72 |
| 4 | 8 | 12 | 16 | 20 | 24 | 28 | 32 | 36 | 40 | 44 | 48 | 52 | 56 | 60 | 64 | 68 | 72 |
| 4 | 8 | 12 | 16 | 20 | 24 | 28 | 32 | 36 | 40 | 44 | 48 | 52 | 56 | 60 | 64 | 68 | 72 |
| 4 | 8 | 12 | 16 | 20 | 24 | 28 | 32 | 36 | 40 | 44 | 48 | 52 | 56 | 60 | 64 | 68 | 72 |

FIG. 5D

| WALSH SYMBOL INDEX | WALSH CHIP WITHIN SYMBOL | | | | | | | | | | | | | | | | |
|---|---|---|---|---|---|---|---|---|---|---|---|---|---|---|---|---|---|
| | 0123 | 4567 | 11<br>8901 | 1111<br>2345 | 1111<br>6789 | 2222<br>0123 | 2222<br>4567 | 2233<br>8901 | 3333<br>2345 | 3333<br>6789 | 4444<br>0123 | 4444<br>4567 | 4455<br>8901 | 5555<br>2345 | 5555<br>6789 | 6666<br>0123 |
| 0 | 0000 | 0000 | 0000 | 0000 | 0000 | 0000 | 0000 | 0000 | 0000 | 0000 | 0000 | 0000 | 0000 | 0000 | 0000 | 0000 |
| 1 | 0101 | 0101 | 0101 | 0101 | 0101 | 0101 | 0101 | 0101 | 0101 | 0101 | 0101 | 0101 | 0101 | 0101 | 0101 | 0101 |
| 2 | 0011 | 0011 | 0011 | 0011 | 0011 | 0011 | 0011 | 0011 | 0011 | 0011 | 0011 | 0011 | 0011 | 0011 | 0011 | 0011 |
| 3 | 0110 | 0110 | 0110 | 0110 | 0110 | 0110 | 0110 | 0110 | 0110 | 0110 | 0110 | 0110 | 0110 | 0110 | 0110 | 0110 |
| 4 | 0000 | 1111 | 0000 | 1111 | 0000 | 1111 | 0000 | 1111 | 0000 | 1111 | 0000 | 1111 | 0000 | 1111 | 0000 | 1111 |
| 5 | 0101 | 1010 | 0101 | 1010 | 0101 | 1010 | 0101 | 1010 | 0101 | 1010 | 0101 | 1010 | 0101 | 1010 | 0101 | 1010 |
| 6 | 0011 | 1100 | 0011 | 1100 | 0011 | 1100 | 0011 | 1100 | 0011 | 1100 | 0011 | 1100 | 0011 | 1100 | 0011 | 1100 |
| 7 | 0110 | 1001 | 0110 | 1001 | 0110 | 1001 | 0110 | 1001 | 0110 | 1001 | 0110 | 1001 | 0110 | 1001 | 0110 | 1001 |
| 8 | 0000 | 0000 | 1111 | 1111 | 0000 | 0000 | 1111 | 1111 | 0000 | 0000 | 1111 | 1111 | 0000 | 0000 | 1111 | 1111 |
| 9 | 0101 | 0101 | 1010 | 1010 | 0101 | 0101 | 1010 | 1010 | 0101 | 0101 | 1010 | 1010 | 0101 | 0101 | 1010 | 1010 |
| 10 | 0011 | 0011 | 1100 | 1100 | 0011 | 0011 | 1100 | 1100 | 0011 | 0011 | 1100 | 1100 | 0011 | 0011 | 1100 | 1100 |
| 11 | 0110 | 0110 | 1001 | 1001 | 0110 | 0110 | 1001 | 1001 | 0110 | 0110 | 1001 | 1001 | 0110 | 0110 | 1001 | 1001 |
| 12 | 0000 | 1111 | 1111 | 0000 | 0000 | 1111 | 1111 | 0000 | 0000 | 1111 | 1111 | 0000 | 0000 | 1111 | 1111 | 0000 |
| 13 | 0101 | 1010 | 1010 | 0101 | 0101 | 1010 | 1010 | 0101 | 0101 | 1010 | 1010 | 0101 | 0101 | 1010 | 1010 | 0101 |
| 14 | 0011 | 1100 | 1100 | 0011 | 0011 | 1100 | 1100 | 0011 | 0011 | 1100 | 1100 | 0011 | 0011 | 1100 | 1100 | 0011 |
| 15 | 0110 | 1001 | 1001 | 0110 | 0110 | 1001 | 1001 | 0110 | 0110 | 1001 | 1001 | 0110 | 0110 | 1001 | 1001 | 0110 |
| 16 | 0000 | 0000 | 0000 | 0000 | 1111 | 1111 | 1111 | 1111 | 0000 | 0000 | 0000 | 0000 | 1111 | 1111 | 1111 | 1111 |
| 17 | 0101 | 0101 | 0101 | 0101 | 1010 | 1010 | 1010 | 1010 | 0101 | 0101 | 0101 | 0101 | 1010 | 1010 | 1010 | 1010 |
| 18 | 0011 | 0011 | 0011 | 0011 | 1100 | 1100 | 1100 | 1100 | 0011 | 0011 | 0011 | 0011 | 1100 | 1100 | 1100 | 1100 |
| 19 | 0110 | 0110 | 0110 | 0110 | 1001 | 1001 | 1001 | 1001 | 0110 | 0110 | 0110 | 0110 | 1001 | 1001 | 1001 | 1001 |
| 20 | 0000 | 1111 | 0000 | 1111 | 1111 | 0000 | 1111 | 0000 | 0000 | 1111 | 0000 | 1111 | 1111 | 0000 | 1111 | 0000 |
| 21 | 0101 | 1010 | 0101 | 1010 | 1010 | 0101 | 1010 | 0101 | 0101 | 1010 | 0101 | 1010 | 1010 | 0101 | 1010 | 0101 |
| 22 | 0011 | 1100 | 0011 | 1100 | 1100 | 0011 | 1100 | 0011 | 0011 | 1100 | 0011 | 1100 | 1100 | 0011 | 1100 | 0011 |
| 23 | 0110 | 1001 | 0110 | 1001 | 1001 | 0110 | 1001 | 0110 | 0110 | 1001 | 0110 | 1001 | 1001 | 0110 | 1001 | 0110 |

FIG. 6A

WALSH CHIP WITHIN SYMBOL

| WALSH SYMBOL INDEX | 0123 | 4567 | 11 8901 | 1111 2345 | 1111 6789 | 2222 0123 | 2222 4567 | 2233 8901 | 3333 2345 | 3333 6789 | 4444 0123 | 4444 4567 | 4455 8901 | 5555 2345 | 5555 6789 | 6666 0123 |
|---|---|---|---|---|---|---|---|---|---|---|---|---|---|---|---|---|
| 24 | 0000 | 0000 | 1111 | 1111 | 1111 | 1111 | 0000 | 0000 | 0000 | 0000 | 1111 | 1111 | 1111 | 1111 | 0000 | 0000 |
| 25 | 0101 | 0101 | 1010 | 1010 | 1010 | 1010 | 0101 | 0101 | 0101 | 0101 | 1010 | 1010 | 1010 | 1010 | 0101 | 0101 |
| 26 | 0011 | 0011 | 1100 | 1100 | 1100 | 1100 | 0011 | 0011 | 0011 | 0011 | 1100 | 1100 | 1100 | 1100 | 0011 | 0011 |
| 27 | 0110 | 0110 | 1001 | 1001 | 1001 | 1001 | 0110 | 0110 | 0110 | 0110 | 1001 | 1001 | 1001 | 1001 | 0110 | 0110 |
| 28 | 0000 | 1111 | 1111 | 0000 | 0000 | 1111 | 1111 | 0000 | 0000 | 1111 | 1111 | 0000 | 0000 | 1111 | 1111 | 0000 |
| 29 | 0101 | 1010 | 1010 | 0101 | 0101 | 1010 | 1010 | 0101 | 0101 | 1010 | 1010 | 0101 | 0101 | 1010 | 1010 | 0101 |
| 30 | 0011 | 1100 | 1100 | 0011 | 0011 | 1100 | 1100 | 0011 | 0011 | 1100 | 1100 | 0011 | 0011 | 1100 | 1100 | 0011 |
| 31 | 0110 | 1001 | 1001 | 0110 | 0110 | 1001 | 1001 | 0110 | 0110 | 1001 | 1001 | 0110 | 0110 | 1001 | 1001 | 0110 |
| 32 | 0000 | 0000 | 0000 | 0000 | 1111 | 1111 | 1111 | 1111 | 1111 | 1111 | 1111 | 1111 | 0000 | 0000 | 0000 | 0000 |
| 33 | 0101 | 0101 | 0101 | 0101 | 1010 | 1010 | 1010 | 1010 | 1010 | 1010 | 1010 | 1010 | 0101 | 0101 | 0101 | 0101 |
| 34 | 0011 | 0011 | 0011 | 0011 | 1100 | 1100 | 1100 | 1100 | 1100 | 1100 | 1100 | 1100 | 0011 | 0011 | 0011 | 0011 |
| 35 | 0110 | 0110 | 0110 | 0110 | 1001 | 1001 | 1001 | 1001 | 1001 | 1001 | 1001 | 1001 | 0110 | 0110 | 0110 | 0110 |
| 36 | 0000 | 1111 | 0000 | 1111 | 1111 | 0000 | 1111 | 0000 | 0000 | 1111 | 0000 | 1111 | 1111 | 0000 | 1111 | 0000 |
| 37 | 0101 | 1010 | 0101 | 1010 | 1010 | 0101 | 1010 | 0101 | 0101 | 1010 | 0101 | 1010 | 1010 | 0101 | 1010 | 0101 |
| 38 | 0011 | 1100 | 0011 | 1100 | 1100 | 0011 | 1100 | 0011 | 0011 | 1100 | 0011 | 1100 | 1100 | 0011 | 1100 | 0011 |
| 39 | 0110 | 1001 | 0110 | 1001 | 1001 | 0110 | 1001 | 0110 | 0110 | 1001 | 0110 | 1001 | 1001 | 0110 | 1001 | 0110 |
| 40 | 0000 | 0000 | 1111 | 1111 | 0000 | 0000 | 1111 | 1111 | 1111 | 1111 | 0000 | 0000 | 1111 | 1111 | 0000 | 0000 |
| 41 | 0101 | 0101 | 1010 | 1010 | 0101 | 0101 | 1010 | 1010 | 1010 | 1010 | 0101 | 0101 | 1010 | 1010 | 0101 | 0101 |
| 42 | 0011 | 0011 | 1100 | 1100 | 0011 | 0011 | 1100 | 1100 | 1100 | 1100 | 0011 | 0011 | 1100 | 1100 | 0011 | 0011 |
| 43 | 0110 | 0110 | 1001 | 1001 | 0110 | 0110 | 1001 | 1001 | 1001 | 1001 | 0110 | 0110 | 1001 | 1001 | 0110 | 0110 |
| 44 | 0000 | 1111 | 1111 | 0000 | 1111 | 0000 | 0000 | 1111 | 1111 | 0000 | 0000 | 1111 | 0000 | 1111 | 1111 | 0000 |
| 45 | 0101 | 1010 | 1010 | 0101 | 1010 | 0101 | 0101 | 1010 | 1010 | 0101 | 0101 | 1010 | 0101 | 1010 | 1010 | 0101 |
| 46 | 0011 | 1100 | 1100 | 0011 | 1100 | 0011 | 0011 | 1100 | 1100 | 0011 | 0011 | 1100 | 0011 | 1100 | 1100 | 0011 |
| 47 | 0110 | 1001 | 1001 | 0110 | 1001 | 0110 | 0110 | 1001 | 1001 | 0110 | 0110 | 1001 | 0110 | 1001 | 1001 | 0110 |

FIG. 6B

WALSH CHIP WITHIN SYMBOL

| | 0123 | 4567 | 11 8901 | 1111 2345 | 1111 6789 | 2222 0123 | 2222 4567 | 2233 8901 | 3333 2345 | 3333 6789 | 4444 0123 | 4444 4567 | 4455 8901 | 5555 2345 | 5555 6789 | 6666 0123 |
|---|---|---|---|---|---|---|---|---|---|---|---|---|---|---|---|---|
| 48 | 0000 | 0000 | 0000 | 0000 | 1111 | 1111 | 1111 | 1111 | 1111 | 1111 | 1111 | 1111 | 0000 | 0000 | 0000 | 0000 |
| 49 | 0101 | 0101 | 0101 | 0101 | 1010 | 1010 | 1010 | 1010 | 1010 | 1010 | 1010 | 1010 | 0101 | 0101 | 0101 | 0101 |
| 50 | 0011 | 0011 | 0011 | 0011 | 1100 | 1100 | 1100 | 1100 | 1100 | 1100 | 1100 | 1100 | 0011 | 0011 | 0011 | 0011 |
| 51 | 0110 | 0110 | 0110 | 0110 | 1001 | 1001 | 1001 | 1001 | 1001 | 1001 | 1001 | 1001 | 0110 | 0110 | 0110 | 0110 |
| 52 | 0000 | 1111 | 0000 | 1111 | 1111 | 0000 | 1111 | 0000 | 1111 | 0000 | 1111 | 0000 | 0000 | 1111 | 0000 | 1111 |
| 53 | 0101 | 1010 | 0101 | 1010 | 1010 | 0101 | 1010 | 0101 | 1010 | 0101 | 1010 | 0101 | 0101 | 1010 | 0101 | 1010 |
| 54 | 0011 | 1100 | 0011 | 1100 | 1100 | 0011 | 1100 | 0011 | 1100 | 0011 | 1100 | 0011 | 0011 | 1100 | 0011 | 1100 |
| 55 | 0110 | 1001 | 0110 | 1001 | 1001 | 0110 | 1001 | 0110 | 1001 | 0110 | 1001 | 0110 | 0110 | 1001 | 0110 | 1001 |
| 56 | 0000 | 0000 | 1111 | 1111 | 1111 | 1111 | 0000 | 0000 | 1111 | 1111 | 0000 | 0000 | 0000 | 0000 | 1111 | 1111 |
| 57 | 0101 | 0101 | 1010 | 1010 | 1010 | 1010 | 0101 | 0101 | 1010 | 1010 | 0101 | 0101 | 0101 | 0101 | 1010 | 1010 |
| 58 | 0011 | 0011 | 1100 | 1100 | 1100 | 1100 | 0011 | 0011 | 1100 | 1100 | 0011 | 0011 | 0011 | 0011 | 1100 | 1100 |
| 59 | 0110 | 0110 | 1001 | 1001 | 1001 | 1001 | 0110 | 0110 | 1001 | 1001 | 0110 | 0110 | 0110 | 0110 | 1001 | 1001 |
| 60 | 0000 | 1111 | 1111 | 0000 | 1111 | 0000 | 0000 | 1111 | 1111 | 0000 | 0000 | 1111 | 0000 | 1111 | 1111 | 0000 |
| 61 | 0101 | 1010 | 1010 | 0101 | 1010 | 0101 | 0101 | 1010 | 1010 | 0101 | 0101 | 1010 | 0101 | 1010 | 1010 | 0101 |
| 62 | 0011 | 1100 | 1100 | 0011 | 1100 | 0011 | 0011 | 1100 | 1100 | 0011 | 0011 | 1100 | 0011 | 1100 | 1100 | 0011 |
| 63 | 0110 | 1001 | 1001 | 0110 | 1001 | 0110 | 0110 | 1001 | 1001 | 0110 | 0110 | 1001 | 0110 | 1001 | 1001 | 0110 |

WALSH SYMBOL INDEX

FIG. 6C

ACCESS CHANNEL LONG CODE MASK

PUBLIC LONG CODE MASK

PRIVATE LING CODE MASK

SYSTEM AND METHOD FOR REDUCING INTERFERENCE GENERATED BY A CDMA COMMUNICATIONS DEVICE

CROSS REFERENCE OF APPLICATION

This is a continuation application of U.S. application Ser. No. 08/639,572, filed Apr. 29, 1996, now U.S. Pat. No. 6,205,109, issued Mar. 20, 2001 to Antonio et al., entitled "System and Method for Reducing Interference Generated by a CDMA Communications Device.

BACKGROUND OF THE INVENTION

I. Field of the Invention

The present invention relates generally to communications systems in which data is transmitted by user communications devices. More particularly, the present invention is directed to a novel system and method for reducing interference generated by a code division multiple access (CDMA) communications device.

II. Description of the Related Art

The use of variable rate encoding techniques in a code division multiple access (CDMA) system provides the ability to reduce the amount of information used to represent speech or other data as compared with fixed rate encoding techniques. For example, by using variable rate vocoding techniques fewer bits of information may be transmitted when speech levels are low. In a CDMA communication system as described in the Telecommunications Industry Association (TIA)/Electronic Industries Association (EIA) Interim Standard IS-95A entitled "Mobile Station—Base Station Compatibility Standard for Dual-Mode Wideband Spread Spectrum Cellular System," variable rate encoded speech or data is transmitted by the communication unit using frames of a fixed time duration. For data rates which are less than the maximum rate, the extra space available in the frame may carry signaling bits, if available, or secondary traffic bits if the communication unit is utilizing, for example, simultaneous voice and data service options. However, if there are not enough bits between primary traffic and signaling or secondary traffic to fill up an entire frame, the remaining blank space in the frame may be distributed among the transmitted bits in a pseudo-random manner, resulting in "bursts" of data being transmitted intermittently throughout the frame. During this blank space, the transmitter is gated off.

Alternatively, for low rate encoded speech or other data, the information bits may be repeated as necessary to fill the frame instead of turning off the transmitter. In such a case, the power of the transmitter is nonetheless typically reduced to conserve battery life and system capacity, since the data redundancy in the frame allows a satisfactory probability of successful reception at a lower signal-to-noise ratio.

As can be seen, the use of variable rate transmission techniques leads to significant variation in the transmit power level of the CDMA transmitter during each frame. The variation in power level may be a mere reduction in the case of repeated bits, or turning off in the case of pseudo-random burst distribution throughout the frame. This variation of the subscriber station's transmit power produces a transmitted signal which is capable of interfering with the operation of nearby electronic equipment. Because this variation modulates the amplitude of the RF energy transmitted, interference which is caused by such transmit power variation is referred to herein as "amplitude modulation interference," or simply "AM interference." It has been found that many electronic devices, such as hearing aids, tend to act as AM detectors, leading to interference being incurred during operation in the presence of transmitters which vary the amplitude of the transmitted signal.

Accordingly, what is needed is a transmission scheme for a CDMA communication system which minimizes the potential for interference with electronic devices.

SUMMARY OF THE INVENTION

The present invention is directed to a system and method for reducing the interference experienced by sensitive electronic devices, such as hearing aids, operative in the vicinity of CDMA user communication devices. As mentioned previously, in CDMA communication systems the transmission of data at variable rates may yield a certain level of AM interference. The various embodiments of the present invention are designed to substantially reduce or eliminate such interference. The present invention is particularly suitable for implementation in a CDMA communication system, such as cellular, mobile, wireless local loop, PCS, and satellite applications, in which system users nominally transmit data at variable rates.

In the present invention, a reduced interference mode signal is provided to the controller of a CDMA communication device associated with an authorized hearing-impaired user. Such authorization will typically be extended to, for example, hearing-impaired users equipped with an electronic hearing aid or the like. In response to the reduced interference mode signal, a transmitter of the communications device is configured to transmit RF energy at a full-rate power level substantially continuously irrespective of the variable data rate at which the transmitter would otherwise be operative due either to the instantaneous level of user speech activity or to the data rate of non-voice data being provided to the transmitter.

The CDMA communication device may be configured for substantially continuous transmission in response to the constant transmission mode signal in many different ways. In a first embodiment of the present invention applicable to variable rate encoded speech, a variable rate vocoder within the transmitter is directed to encode voice data at a full-rate irrespective of the instantaneous level of user speech activity. By performing continuous full-rate vocoding, the variable rate vocoder generates sufficient bits to fill each frame, resulting in the continuous transmission of full-rate frames. By continuously transmitting full-rate frames, the communication device avoids the generation of the AM interference normally associated with the transmission of variable rate vocoded speech.

In a second embodiment of the present invention applicable to both variable rate encoded speech and non-speech data, a controller within the transmitter generates only full frames. When non-full rate data is provided to the controller, it generates full frames consisting of repeated versions of the non-full rate data. However, each of the frames containing repeated data is transmitted at a full rate power level. The transmit power level is not reduced in response to the amount of data redundancy in the frame. By continuously transmitting full frames at a full rate power level, the communication device avoids the generation of the AM interference normally associated with the transmission of variable rate vocoded speech and non-vocoded data.

In a third embodiment of the present invention applicable to both variable rate encoded speech and non-speech data, a controller in the communication device builds only full-rate frames of data for transmission. If there are not enough bits to fill the frame between primary traffic, signaling and secondary traffic, the controller pads the frame with signaling traffic of a unique pattern to fill the full rate frame. In this embodiment, the base station recognizes the unique pattern of signaling traffic, and discards it upon reception. By continuously transmitting full-rate frames, the communication device avoids the generation of the AM interference normally associated with the transmission of variable rate vocoded speech and non-vocoded data.

It should be noted that in each of the above-described embodiments, the present invention is not limited to a particular frame length or multiplex format. For example, the teachings of the present invention are equally applicable to the 14.4 kbps service option multiplex format of ANSI J-STD-008 entitled "Personal Station—Base Station Compatibility Requirements for 1.8 to 2.0 Ghz Code Division Multiple Access (CDMA) Personal Communications Systems" as they are to the 9.6 kbps service option multiplex format of IS-95A.

A number of authorization schemes may be instituted as a means of ensuring that only those CDMA communication units associated with selected eligible users (e.g., hearing impaired users) are permitted to engage in the type of reduced interference transmission contemplated by the invention. For example, only eligible hearing impaired users could be allowed to purchase CDMA communication units pre-authorized for operation in a reduced interference mode. Alternately, eligible hearing impaired users could obtain authorization from their cellular service provider after purchase of a CDMA communication unit capable of reduced interference mode operation. Additionally, reduced interference mode operation, once authorized, could be activated either by dataport programming of the communication device or by over-the-air service programming.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein:

FIGS. 5a–5d illustrate in a series of charts the ordering of code symbols in the interleaver array for transmission data rates of 9.6, 4.8, 2.4 and 1.2 kbps, respectively;

FIGS. 6a–6c are a series of charts illustrating the Walsh symbols corresponding to each encoder symbol group;

FIGS. 10a–10d are a series of diagrams illustrating data positioning within the frames for the various data rates while FIG. 10e is a diagram illustrating the data used in determining data position within the frame.

DETAILED DESCRIPTION OF THE PREFERRED EMBODIMENTS

I. Overview of Exemplary CDMA Transmission System

Figure 1:
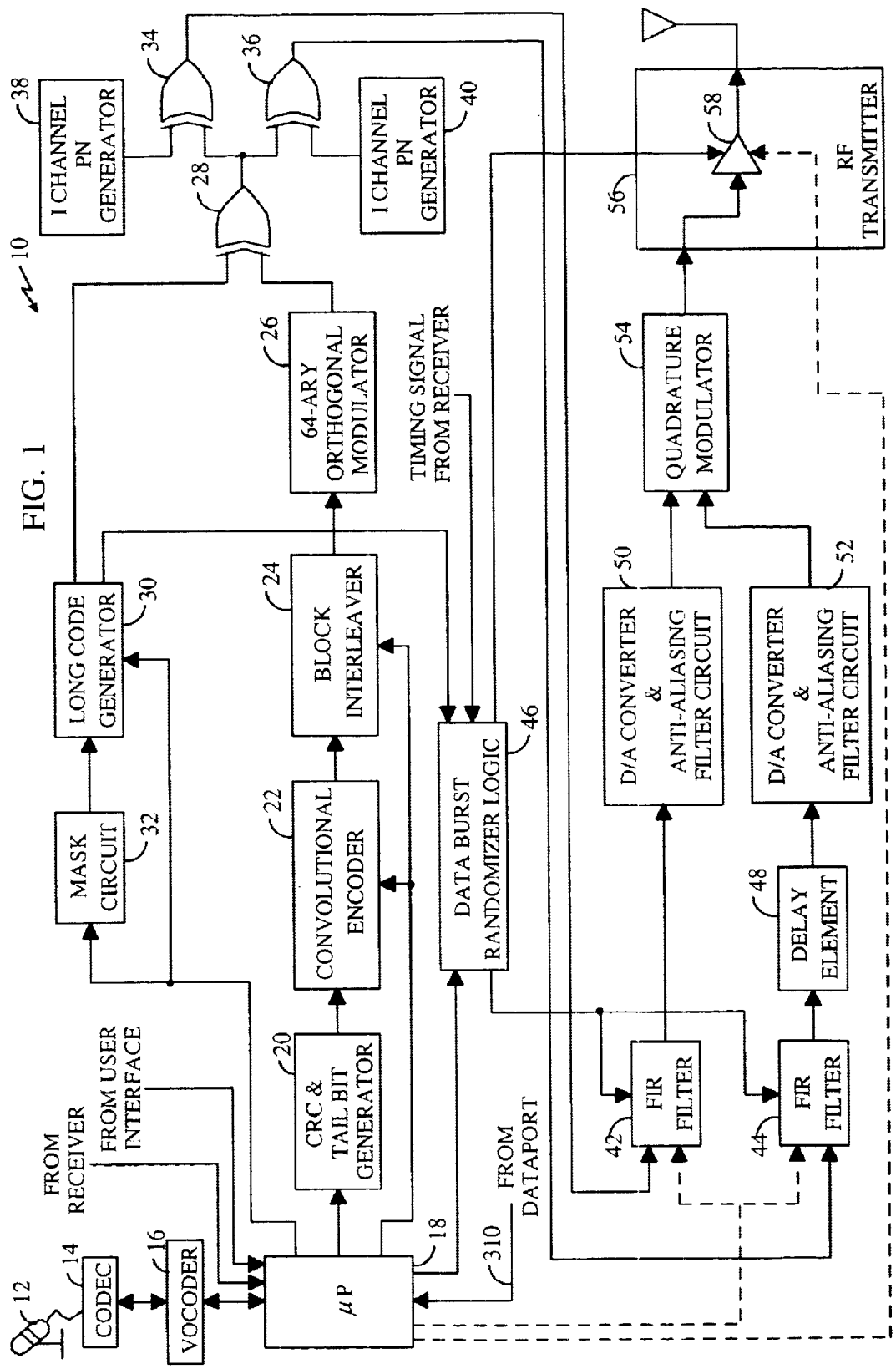
FIG. 1 is a block diagram illustrating an exemplary transmitter portion of a CDMA transceiver disposed for reduced interference mode operation in accordance with the invention.

Referring now to the drawings, FIG. 1 illustrates an exemplary embodiment of a transmit portion 10 of a CDMA communication unit transceiver. The operation of the CDMA transceiver in accordance with the reduced interference modes contemplated by the invention is described below in section II. It should be noted that the present invention is applicable to CDMA transceivers in non-cellular applications such as wireless local loop, PCS, and satellite systems. However, for purposes of illustration, it will suffice to refer to a cellular mobile station transceiver.

In a CDMA cellular communication system a forward CDMA channel is used to transmit information from a cell base station to the mobile station. Conversely, a reverse CDMA channel is used to transmit information from the mobile station to the cell base station. The communication of signals from the mobile station may be characterized in the form of an access channel or a traffic channel communication. The access channel is used for short signaling messages such as call originations, responses to pages, and registrations. The traffic channel is used to communicate (1) primary traffic, typically user speech data, or (2) secondary traffic, typically user non-speech data, or (3) signaling traffic, such as command and control signals, or (4) a combination of primary traffic and secondary traffic or (5) a combination of primary traffic and signaling traffic.

Transmit portion 10 enables data to be transmitted on the reverse CDMA channel at data rates of 9.6 kbps, 4.8 kbps, 2.4 kbps or 1.2 kbps. Transmissions on the reverse traffic channel may be at any of these data rates while transmissions on the access channel are at the 4.8 kbps data rate. The transmission duty cycle on the reverse traffic channel will vary with the transmission data rate. Specifically, the transmission duty cycle for each rate is provided in Table I. As the duty cycle for transmission varies proportionately with the data rate, the actual burst transmission rate is fixed at 28,800 code symbols per second. Since six code symbols are modulated as one of 64 Walsh symbols for transmission, the Walsh symbol transmission rate shall be fixed at 4800 Walsh symbols per second which results in a fixed Walsh chip rate of 307.2 kcps.

All data that is transmitted on the reverse CDMA channel is convolutional encoded, block interleaved, modulated by 64-ary orthogonal modulation, and direct-sequence PN spread prior to transmission. Table I further defines the relationships and rates for data and symbols for the various transmission rates on the reverse traffic channel. The numerology is identical for the access channel except that the transmission rate is fixed at 4.8 kbps, and the duty cycle is 100%. As described later herein each bit transmitted on the reverse CDMA channel is convolutional encoded using a rate $\frac{1}{3}$ code. Therefore, the code symbol rate is always three times the data rate. The rate of the direct-sequence spreading functions shall be fixed at 1.2288 Mhz so that each Walsh chip is spread by precisely four PN chips.

TABLE I

| Bit Rate (kbps) | 9.6 | 4.8 | 2.4 | 1.2 |
|---|---|---|---|---|
| PN Chip Rate (Mcps) | 1.2288 | 1.2288 | 1.2288 | 1.2288 |
| Code Rate (bits/code symbol) | 1/3 | 1/3 | 1/3 | 1/3 |
| TX Duty Cycle (%) | 100.0 | 50.0 | 25.0 | 12.5 |
| Code Symbol Rate (sps) | 28800 | 28800 | 28800 | 28800 |
| Modulation (code symbol/Walsh symbol) | 6 | 6 | 6 | 6 |
| Walsh Symbol Rate (sps) | 4800 | 4800 | 4800 | 4800 |
| Walsh Chip Rate (kcps) | 307.20 | 307.20 | 307.20 | 307.20 |
| Walsh Symbol (ms) | 208.33 | 208.33 | 208.33 | 208.33 |
| PN Chips/Code Symbol | 42.67 | 42.67 | 42.67 | 42.67 |
| PN Chips/Walsh Symbol | 256 | 256 | 256 | 256 |
| PN Chips/Walsh Chip | 4 | 4 | 4 | 4 |

Transmit portion 10, when functioning in a mode in which primary traffic is present, communicates acoustical signals, such as speech and/or background noise, as digital signals over the transmission medium. To facilitate the digital communication of acoustical signals, these signals are sampled and digitized by well known techniques. For example, in FIG. 1, sound is converted by microphone 12 to an analog signal which is then converted to a digital signal by CODEC 14. CODEC 14 typically performs an analog to digital conversion process using a standard 8-bit/mlaw format. In the alternative, the analog signal may be directly converted to digital form in a uniform pulse code modulation (PCM) format. In an exemplary embodiment, CODEC 14 uses 8 kHz sampling and provides an output of 8-bit samples at the sampling rate, so as to realize a 64 kbps data rate.

The 8-bit samples are output from CODEC 14 to vocoder 16 where an mlaw/uniform code conversion process is performed. In vocoder 16, the samples are organized into frames of input data wherein each frame is comprised of a predetermined number of samples. In a preferred implementation of vocoder 16 each frame is comprised of 160 samples or of 20 msec. of speech at the 8 kHz sampling rate. It should be understood that other sampling rates and frame sizes may be used. Each frame of speech samples is variable rate encoded by vocoder 16 with the resultant parameter data formatted into a corresponding data packet. The vocoder data packets are then output to microprocessor 18 and associated circuitry for transmission formatting. Microprocessor 18 generically includes program instructions contained with a program instruction memory, a data memory, and appropriate interface and related circuitry as is known in the art.

A preferred implementation of vocoder 16 utilizes a form of the Code Excited Linear Predictive (CELP) coding techniques so as to provide a variable rate in coded speech data. A Linear Predictive Coder (LPC) analysis is performed upon a constant number of samples, and the pitch and codebook searches are performed on varying numbers of samples depending upon the transmission rate. A variable rate vocoder of this type is described in further detail in U.S. Pat. No. 5,414,796, entitled "VARIABLE RATE VOCODER" and assigned to the assignee of the present invention. Vocoder 16 may be implemented in an application specific integrated circuit (ASIC) or in a digital signal processor.

In the variable rate vocoder just mentioned, the speech analysis frames are 20 msec. in length, implying that the extracted parameters are output to microprocessor 18 in a burst 50 times per second. Furthermore the rate of data output is varied from roughly 8 kbps to 4 kbps to 2 kbps, and to 1 kbps.

At full rate, also referred to as rate 1, data transmission between the vocoder 16 and the microprocessor 18 is at an 8.55 kbps rate. For the full rate data the parameters are encoded for each frame and represented by 160 bits. The full rate data frame also includes a parity check of 11 bits thus resulting in a full rate frame being comprised of a total of 171 bits. In the full rate data frame, the transmission rate between the vocoder 16 and the microprocessor 18 absent the parity check bits would be 8 kbps.

At half rate, also referred to as rate ½, data transmission between the vocoder and the microprocessor is at a 4 kbps rate with the parameters encoded for each frame using 80 bits. At quarter rate, also referred to as rate ¼, data transmission between the vocoder 16 and the microprocessor 18 is at a 2 kbps rate with the parameters encoded for each frame using 40 bits. At eighth rate, also referred to as rate ⅛, data transmission between the vocoder 16 and the microprocessor 18 is slightly less than a 1 kbps rate with the parameters encoded for each frame using 16 bits.

In addition, no information may be sent in a frame between the vocoder 16 and the microprocessor 18. This frame type, referred to as a blank frame, may be used for signaling or other non-vocoder data.

The vocoder data packets are then output to microprocessor 18 and then to CRC and Tail Bit generator 20 for completing the transmission formatting. Microprocessor 18 receives packets of parameter data every 20 msec., along with a rate indication for the rate the frame of speech samples, was encoded. Microprocessor 18 also receives, if present, an input of secondary traffic data for output to generator 20. Microprocessor 18 also internally generates signaling data for output to generator 20. Data whether it is primary traffic, secondary traffic or signaling traffic matter, if present, is output from microprocessor 18 to generator 20 every 20 msec. frame.

Generator 20 generates and appends at the end of all full and half rate frames a set of parity check bits or cyclic redundancy check bits (CRC Bits) which are used at the receiver as a frame quality indicator. For a full rate frame, regardless of whether the data is a full rate primary, secondary or signaling traffic, or a combination of half rate primary and secondary traffic, or a combination of half rate primary and signaling traffic, generator 20 preferably generates a set of CRC Bits according to a first polynomial. For a half rate data frame, generator 20 also generates a set of CRC Bits preferably according to a second polynomial. Generator 20 further generates for all frames, regardless of the frame data rate, a set of Encoder Tail Bits. The Encoder Tail Bits follow the CRC bits, if present, or data if the CRC bits are not present, but in either case the Encoder Tail Bits are placed at the end of the frame. Further details of the operation on microprocessor 18 and generator 20 are provided later herein with reference to FIGS. 3 and 4.

Figure 2A:
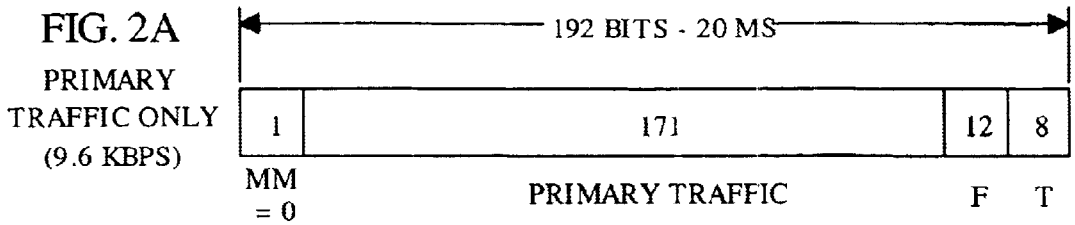
FIGS. 2a–2h are a series of diagrams illustrating frame multiplex option formats for the various data rates and types.
Figure 2B:
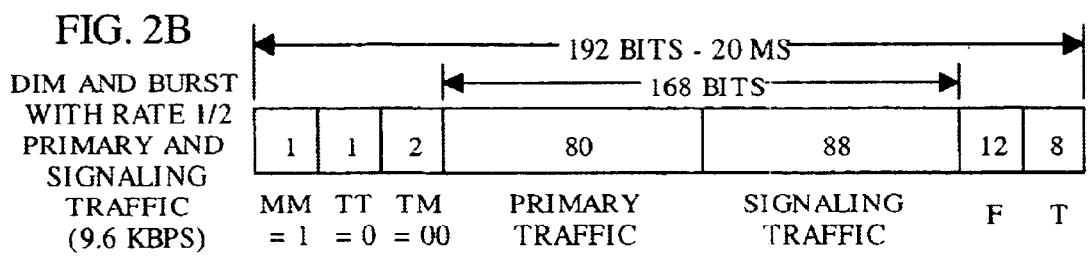
Figure 2C:
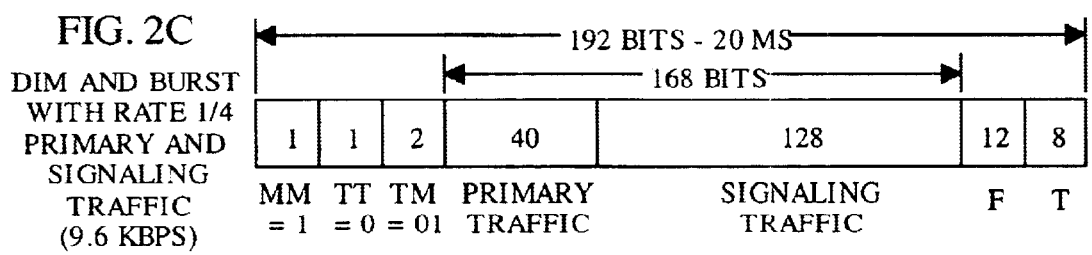
Figure 2D:
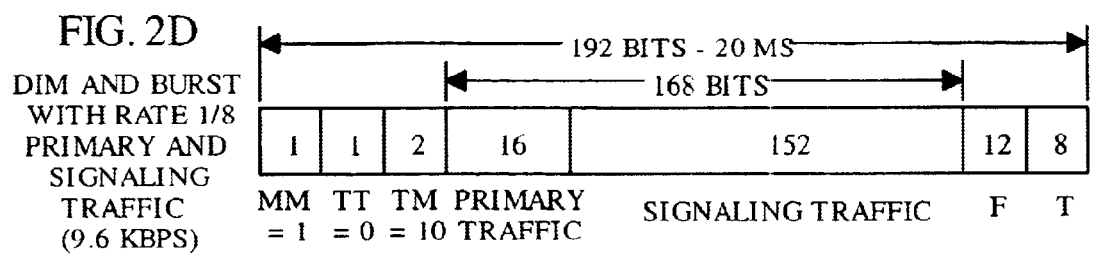
Figure 2E:
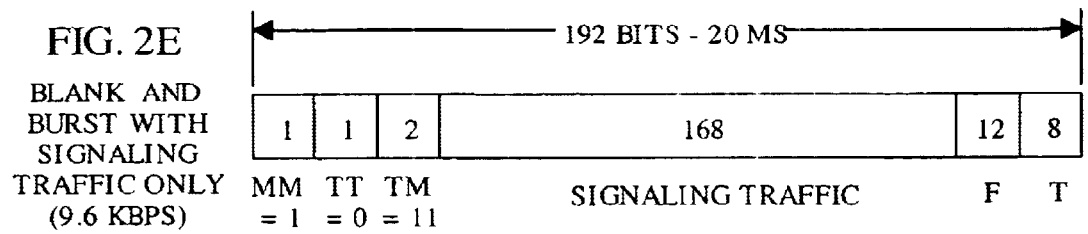
Figure 2F:
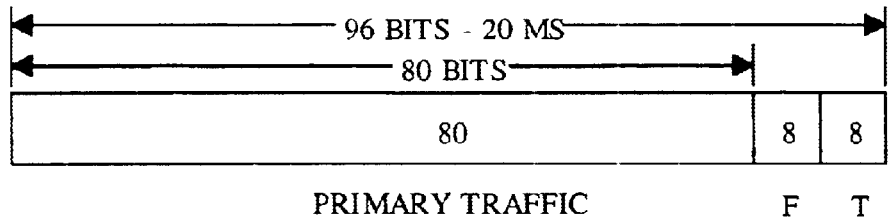
Figure 2G:
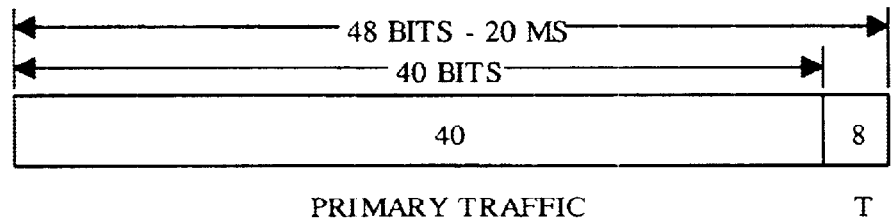
Figure 2H:
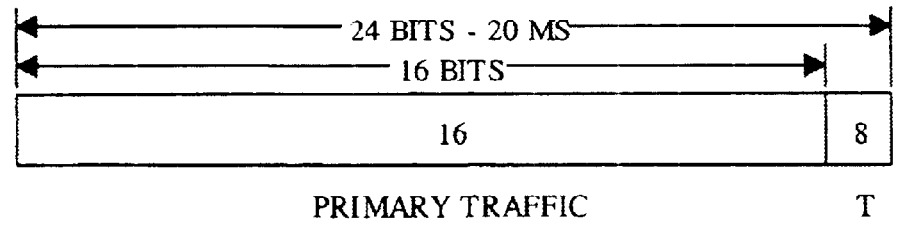

FIGS. 2a–2h illustrate the frame formatting of data for the various data rates and data types for the reverse traffic channel. It should be noted that the illustrated frame formatting is merely exemplary and that other frame formats may be readily substituted therefor. Specifically, FIGS. 2a–2e illustrate the data formatting for the various data types, i.e. vocoder and non-vocoder or combination thereof, at the 9.6 kbps data rate. FIGS. 2f–2h illustrate the data formatting for vocoder data at rates 4.8, 2.4 and 1.2 kbps, respectively. In FIGS. 2a–2h in addition to the primary traffic bits and/or signaling/secondary traffic bits, additional control bits are transmitted in the frame. The following notation applies to the control bits in FIGS. 2a–2h and the bit values:

Mixed Mode Bit (MM):
'0'—Primary Traffic Only
'1'—Primary Traffic and/or Signaling Traffic or Secondary Traffic Traffic type Bit (TT):
'0'—Signaling Traffic
'1'—Secondary Traffic Traffic Mode Bits (TM):
'00'—80 Primary Traffic Bits and either 88 Signaling Traffic or 88 Secondary Traffic Bits
'01'—40 Primary Traffic Bits and either 128 Signaling Traffic or 128 Secondary Traffic Bits
'10'—16 Primary Traffic Bits and either 152 Signaling Traffic or 152 Secondary Traffic Bits
'11'—168 Signaling Traffic Bits or 168 Secondary Traffic Bits Frame Quality Indicator Bits—CRC (F); and Encoder Tail Bits (T)

Reverse traffic channel frames provided from generator 20 at the 9.6 kbps rate are 192 bits in length and span the 20 msec. frame. These frames consist of a single Mixed Mode Bit, auxiliary format bits if present, message bits, a 12-bit frame quality indicator (CRC), and 8 Encoder Tail Bits as shown in FIGS. 2a–2e. The Mixed Mode Bit shall be set to '0' during any frame in which the message bits are primary traffic information only. When the Mixed Mode Bit is '0', the frame shall consist of the Mixed Mode Bit, 171 Primary Traffic bits, 12 CRC Bits, and 8 Encoder Tail Bits.

The Mixed Mode Bit is set to '1' for frames containing secondary or signaling traffic. In these instances the first bit following the Mixed Mode Bit is a Traffic Type Bit. The Traffic Type Bit is used to specify whether the frame contains secondary or signaling traffic. If the Traffic Type Bit is a '0', the frame contains signaling traffic, and if a '1', the frame contains secondary traffic. FIGS. 2b–through 2e illustrate the use of the Traffic Type Bit, with the Traffic Type Bit set to '0' for signaling traffic.

The two auxiliary format bits following the Traffic Type Bit are Traffic Mode Bits. These bits indicate the number of bits that are used for primary traffic information, and the number of bits that shall be used for either signaling or secondary traffic information within that frame. Referring to FIG. 2b, in the exemplary and preferred embodiment, 80 bits are used for primary traffic (half rate vocoder data packet) while 88 bits are used for signaling or secondary traffic.

In the preferred implementation, only primary traffic is transmitted in frames at the 4.8 kbps, 2.4 kbps, and 1.2 kbps rates. Mixed mode operation is generally not supported at rates other than the 9.6 kbps rate, although it may be readily configured. The frame formats for these particular rates are shown in FIGS. 2f–2h. For the 4.8 kbps rate, the frame is 96 bits in length with the bits spaced over the 20 msec. time period of the frame as described later herein. The 4.8 kbps rate frame contains 80 primary traffic bits, an 8-bit frame quality indicator (CRC), and 8 Encoder Tail Bits. For the 2.4 kbps rate, the frame is 48-bits in length with the bits spaced over the 20 msec. time period of the frame as also described later herein. The 2.4 kbps rate frame contains 40 primary traffic bits and 8 Encoder Tail Bits. For the 1.2 kbps rate, the frame is 24-bits in length with the bits spaced over the 20 msec. time period of the frame as also described later herein. The 1.2 kbps rate frame contains 16 primary traffic bits and 8 encoder tail bits.

In a preferred embodiment, the access channel data is generated by microprocessor 18 for transmission at a rate of 4.8 kbps. As such the data is prepared in a manner identical to that of 4.8 kbps frame format data, such as encoding, interleaving and Walsh encoding. In the encoding scheme implemented for the 4.8 kbps data, whether reverse traffic channel data or access channel data, redundant data is generated. Unlike the reverse traffic channel where the redundant data is eliminated in the transmission, in the access channel all data including redundant data is transmitted. Details on the transmission aspects of frames of access channel data are provided later herein.

Figure 3:
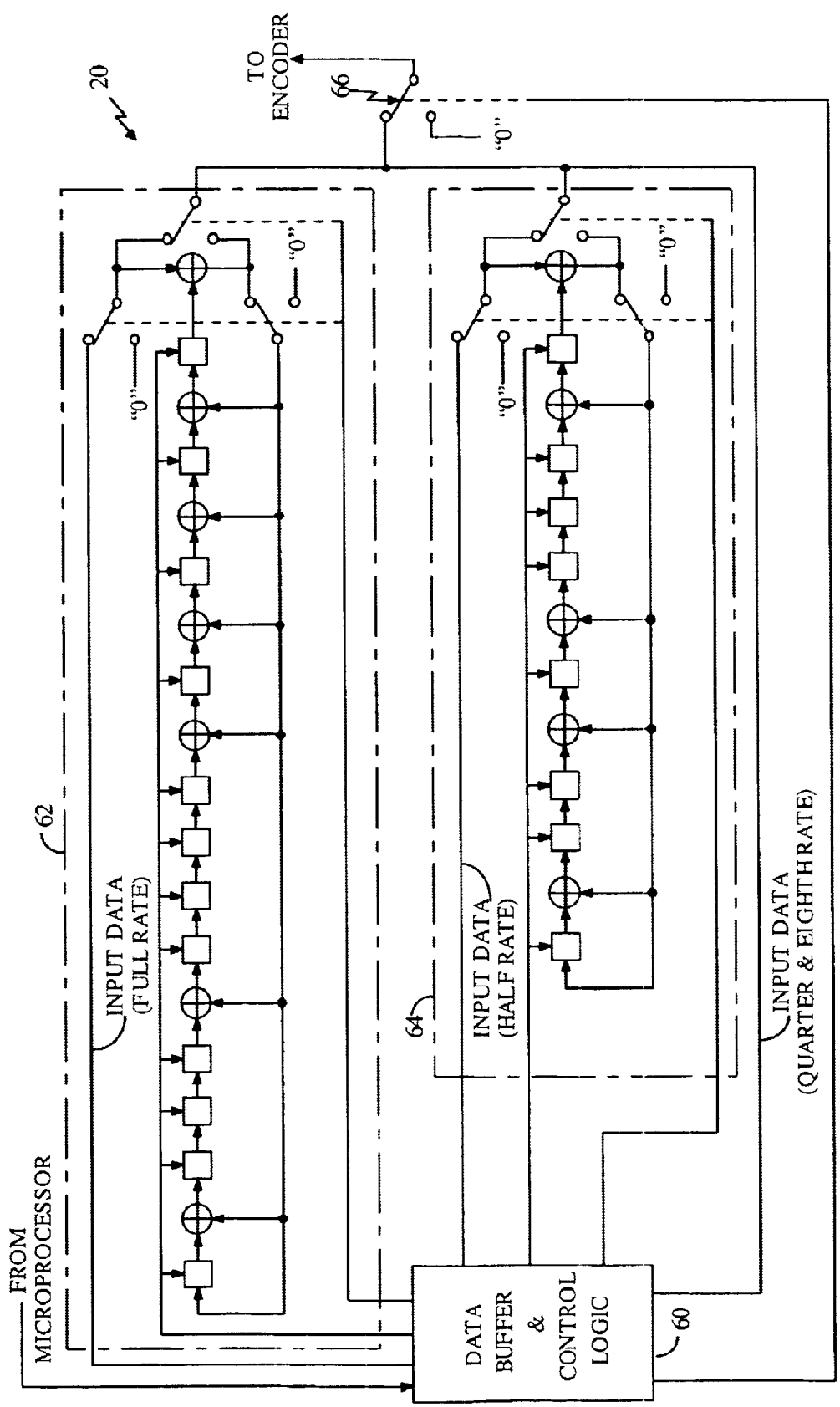
FIG. 3 is a diagram illustrating an exemplary circuit implementation of the CRC and Tail Bit generator of FIG. 1.
Figure 4A:
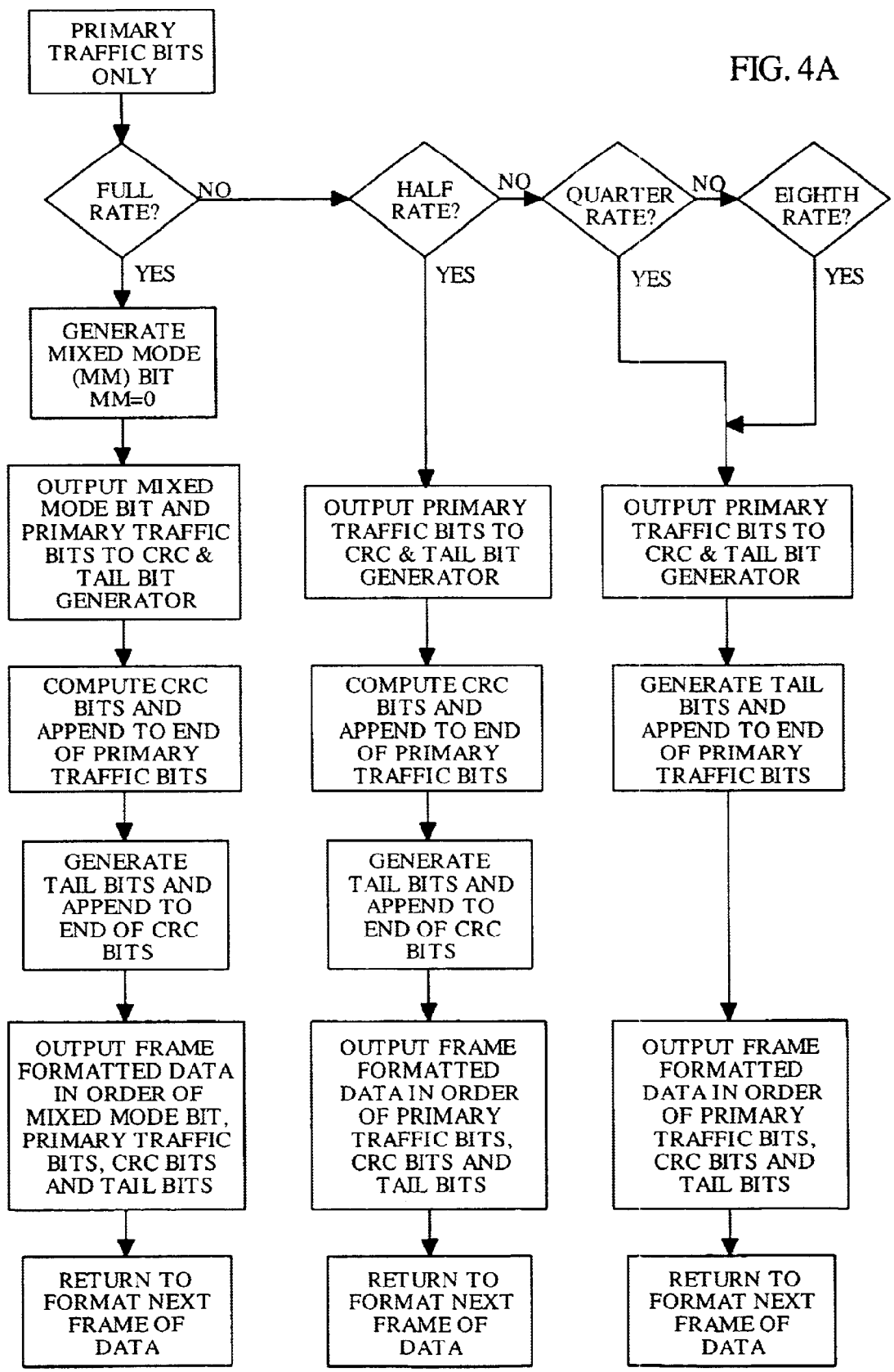
FIGS. 4a–4e are a series of flow charts illustrating the process of formatting the data frames.
Figure 4B:
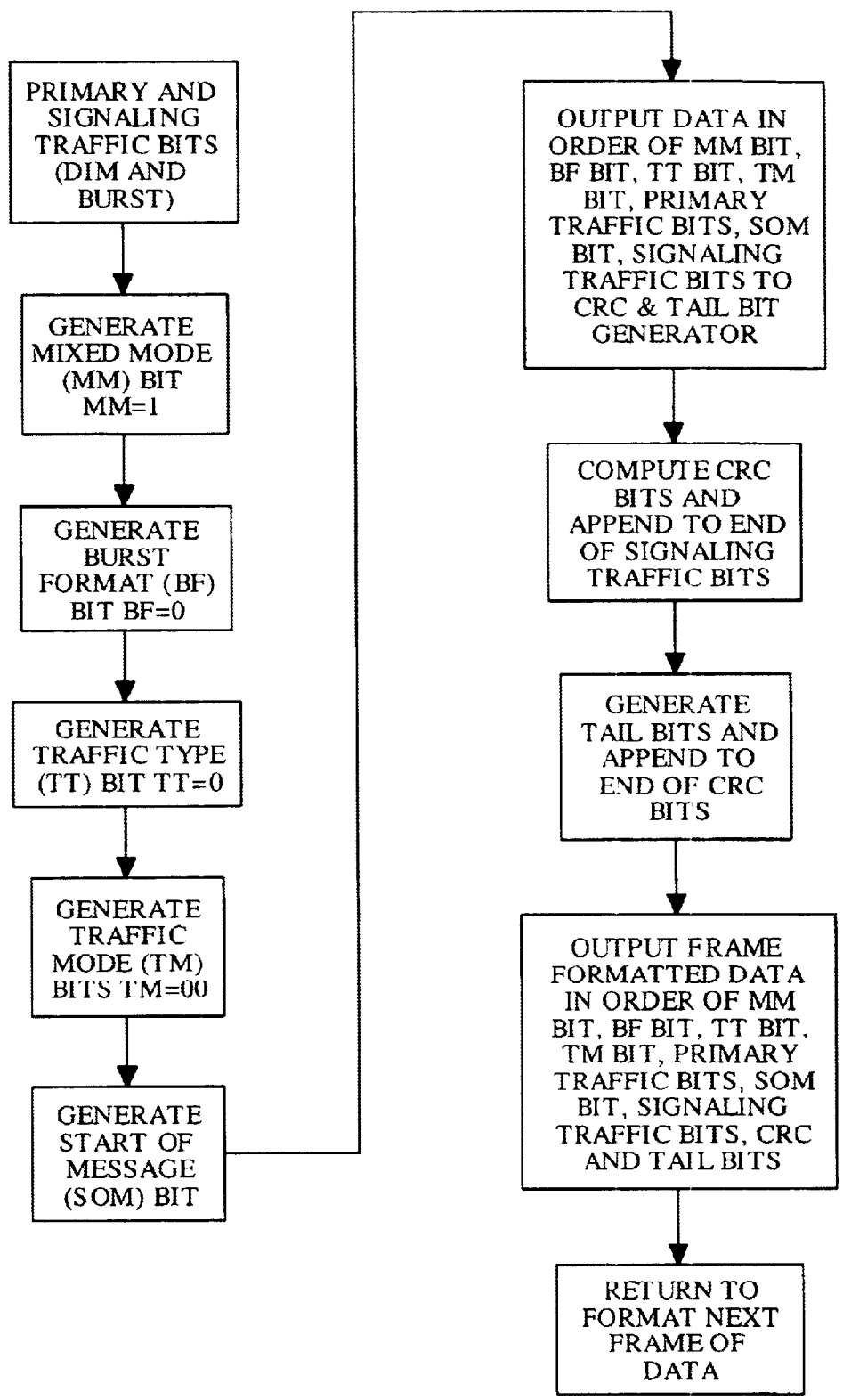
Figure 4C:
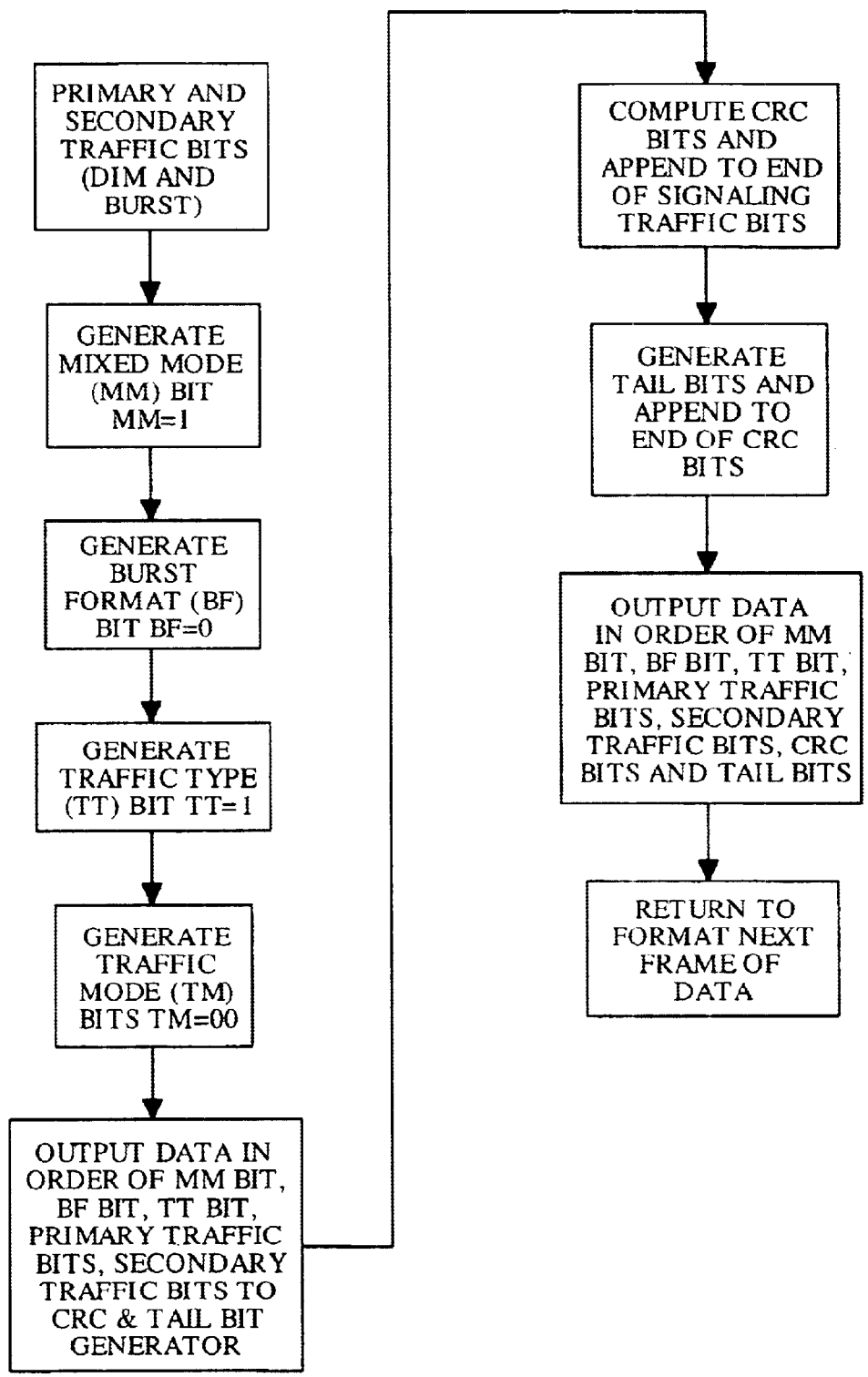
Figure 4D:
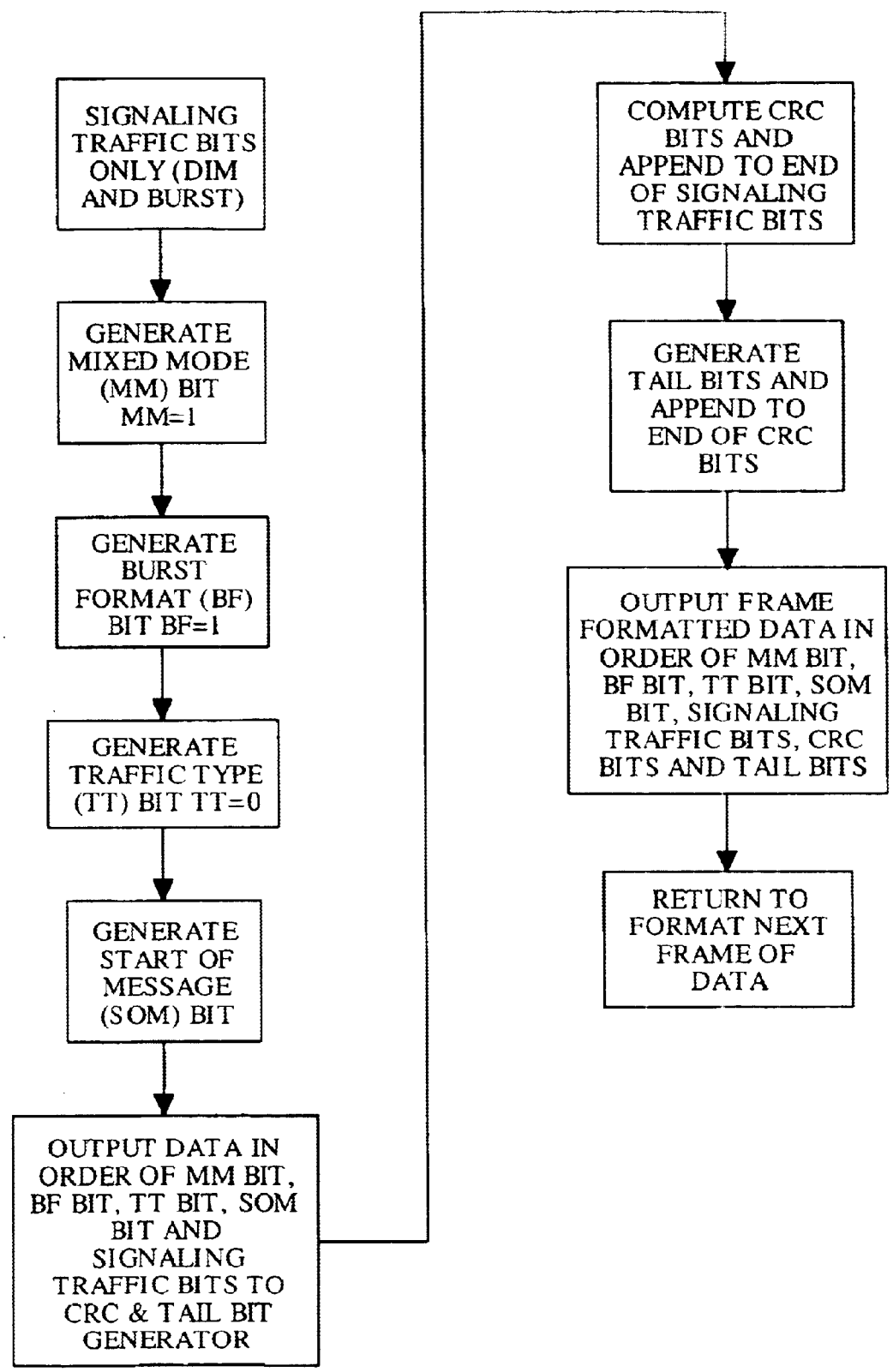
Figure 4E:
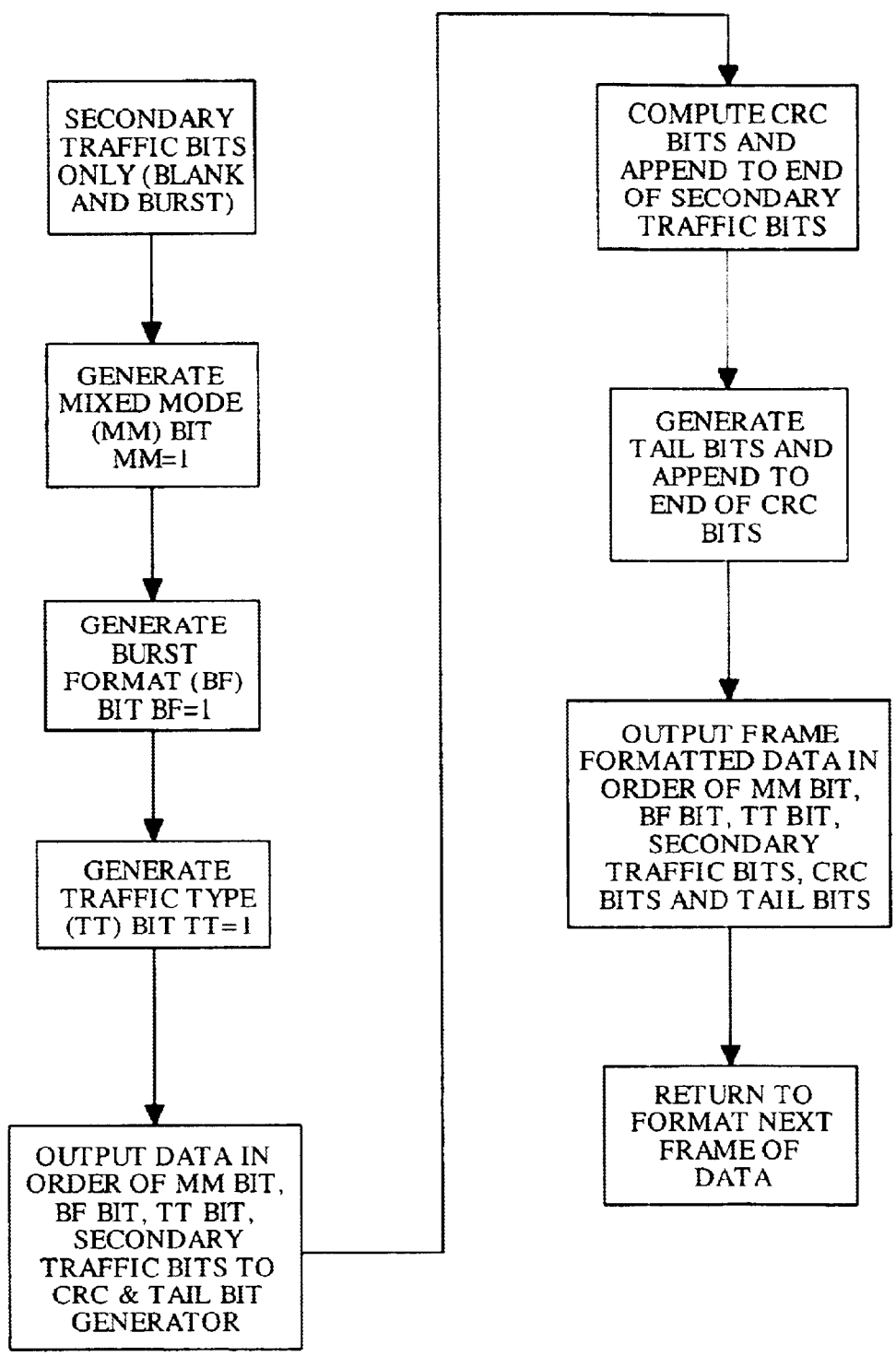

FIG. 3 illustrates an exemplary implementation of the elements for formatting the data in accordance with FIGS. 2a–2h. In FIG. 3, data is transmitted from microprocessor 18 (FIG. 1) to generator 20. Generator 20 is comprised of data buffer and control logic 60, (hereinafter referred to as logic 60), CRC circuits 62 and 64, and Tail Bit circuit 66. Along with data provided from the microprocessor 18, a rate command may optionally be provided. Data is transferred for each 20 msec. frame from the microprocessor to logic 60 where temporarily stored. For each frame, logic 60 may count the number of bits transmitted from the microprocessor, or in the alternative use the rate command and a count of the clock cycles in formatting a frame of data.

Each frame of the traffic channel includes a frame quality indicator. For the 9.6 kbps and 4.8 kbps transmission rates, the frame quality indicator is the CRC. For the 2.4 kbps and 1.2 kbps transmission rates, the frame quality indicator is implied, in that no extra frame quality bits are transmitted. The frame quality indicator supports two functions at the receiver. The first function is to determine the transmission rate of the frame, while the second function is to determine whether the frame is in error. At the receiver these determinations are made by a combination of the decoder information and the CRC checks.

For the 9.6 kbps and 4.8 kbps rates, the frame quality indicator (CRC) is calculated on all bits within the frame, except the frame quality indicator (CRC) itself and the Encoder Tail Bits. Logic 60 provides the 9.6 kbps and 4.8 kbps rate data respectively to CRC circuits 62 and 64. Circuits 62 and 64 are typically constructed as a sequence of shift registers, modulo-2 adders (typically exclusive-OR gates), and switches as illustrated.

The 9.6 kbps transmission rate data uses a 12-bit frame quality indicator (CRC), which is to be transmitted within the 192-bit long frame as discussed with reference to FIGS. 2a–2e. As illustrated in FIG. 3 for CRC circuit 62, the generator polynomial for the 9.6 kbps rate is as follows:

$$g(x)=x^{12}+x^{11}+x^{10}+x^9+x^8+x^4+x+1. \qquad (1)$$

The 4.8 kbps transmission rate data uses an 8-bit CRC, which is transmitted within the 96-bit long frame as discussed with reference to FIG. 2f. As illustrated in FIG. 3 for CRC circuit 64, the generator polynomial for the 4.8 kbps rate is as follows:

$$g(x)=x^8+x^7+x^4+x^3+x+1. \qquad (2)$$

Initially, all shift register elements of circuits 62 and 64 are set to logical one ('1') by an initialization signal from logic 60. Furthermore logic 60 sets the switches of circuits 62 and 64 in the up position.

For 9.6 kbps rate data, the registers of circuit 62 are then clocked 172 times for the 172 bits in the sequence of primary traffic, secondary traffic or signaling bits or a mixture thereof along with the corresponding mode/format indicator bits as input to circuit 62. After 172 bits are clocked through circuit 62, logic 60 then sets the switches of circuit 62 in the down position with the registers of circuit 62 then being clocked an additional 12 times. As a result of the 12 additional clockings of circuit 62, 12 additional output bits are generated which are the CRC bits. The CRC bits, in the order calculated, are appended to the end of the 172 bits as output from circuit 62. It should be noted that the 172 bits output from logic 60 which pass through circuit 62 are undisturbed by the computation of the CRC bits and are thus output from circuit 62 in the same order and at the same value at which they entered.

For 9.6 kbps rate, data bits are input to circuit 62 from logic 60 in the following order. For the case of primary traffic only, the bits are input to circuit 62 from logic 60 in the order of the single mixed mode (MM) bit followed by the 171 primary traffic bits. For the case of 'dim and burst' with rate one-half primary and signaling traffic as shown in FIG. 2b, the bits are input to circuit 62 from logic 60 in the order of the single MM bit, a traffic type (TT) bit, a pair of traffic mode (TM) bits, 80 primary traffic bits, and 88 signaling traffic bits. For the case of 'blank and burst' data format with signaling traffic only as shown in FIG. 2e, the bits are input to circuit 62 from logic 60 in the order of the single MM bit, the TT bit, a pair of traffic mode (TM) bits and 168 signaling traffic bits.

Similarly for 4.8 kbps rate data, the registers of circuit 64 are clocked 80 times for the 80 bits of primary traffic data, or for the 80 bits of access channel data, as input to circuit 64 from logic 60. After the 80 bits are clocked through circuit 64, logic 60 then sets the switches of circuit 64 in the down position with the registers of circuit 64 then being clocked an additional 8 times. As a result of the 8 additional clockings of circuit 64, 8 additional output bits are generated which are the CRC bits. The CRC bits, in the order calculated, are again appended to the end of the 80 bits as output from circuit 64. It should again be noted that the 80 bits output from logic 60 which pass through circuit 64 are undisturbed by the computation of the CRC bits and are thus output from circuit 64 in the same order and at the same value at which they entered.

The bits output from either of circuits 62 and 64 are provided to switch 66 which is under the control of logic 60. Also input to switch 66 are the 40 and 16 bits of primary traffic data output from logic 60 for 2.4 kbps and 1.2 kbps data frames. Switch 66 selects between providing an output of the input data (up position) and tail bits at a logical zero ('0') value (down position). Switch 66 is normally set in the up position to permit data from logic 60, and from circuits 62 and 64 if present, to be output from generator 20 to encoder 22 (FIG. 1). For the 9.6 kbps and 4.8 kbps frame data, after the CRC bits are clocked through switch 66, logic 60 sets the switch to the down position for 8 clock cycles so as to generate 8 all zero tail bits. Thus for 9.6 kbps and 4.8 kbps data frames, the data as output to the encoder for the frame includes, appended after the CRC bits, the 8 tail bits. Similarly for the 2.4 kbps and 1.2 kbps frame data, after the primary traffic bits are clocked from logic 60 through switch 66, logic 60 sets the switch to the down position for 8 clock cycles so as to again generate 8 all zero tail bits. Thus for 2.4 kbps and 1.2 kbps data frames, the data as output to the encoder for the frame includes appended after the primary traffic bits, the 8 tail bits.

FIGS. 4a–4e illustrate in a series of flow charts the operation of microprocessor 18, and generator 20 in assembling the data into the disclosed frame format. It should be noted that various schemes may be implemented for giving the various traffic types and rates priority for transmission. In an exemplary implementation, when a signaling traffic message is to be sent when there is vocoder data present a 'dim and burst' format may be selected. Microprocessor 18 may generate a command to vocoder 16 for the vocoder to encode speech sample frames at the half rate, regardless of the rate at which the vocoder would have otherwise normally encoded the sample frame. Microprocessor 18 then assembles the half rate vocoder data with the signaling traffic into the 9.6 kbps frame as illustrated in FIG. 2b. In this case, a limit may be placed on the number of speech frames encoded at the half rate to avoid degradation in the speech quality. In the alternative, microprocessor 18 may wait until a half rate frame of vocoder data is received before assembling the data into the 'dim and burst' format. In this case, in order to ensure timely transmission of the signaling data, a maximum limit on the number of consecutive frames at other than half rate may be imposed before a command is sent to the vocoder to encode at half rate. Secondary traffic may be transferred in the 'dim and burst' format (FIG. 2c) in a similar manner.

Similar is the case for the 'blank and burst' data formats as illustrated in FIG. 2e. The vocoder may be commanded to not encode the frame of speech samples or the vocoder data is ignored by the microprocessor in constructing the data frame. Prioritizing between generating frame formats of primary traffic at various rates, 'dim and burst' traffic, and 'blank and burst' traffic is open to many possibilities.

Referring back to FIG. 1, 20 msec. frames of 9.6 kbps, 4.8 kbps, 2.4 kbps and 1.2 kbps data are thus output from generator 20 to encoder 22. In the exemplary embodiment encoder 22 is preferably a convolutional encoder, a type of encoder well known in the art. Encoder 22 preferably encodes the data using a rate $\frac{1}{3}$, constraint length k=9 convolutional code. As an example encoder 22 is constructed with generator functions of $g_0$=557(octal), $g_1$=663 (octal) and $g_2$ =711(octal). As is well known in the art, convolutional encoding involves the modulo-2 addition of selected taps of a serially time-shifted delayed data sequence. The length of the data sequence delay is equal to k−1, where k is the code constraint length. Since in the preferred embodiment a rate $\frac{1}{3}$ code is used, three code symbols, the code symbols ($c_0$), ($c_1$) and ($c_2$), are generated for each data bit input to the encoder. The code symbols ($c_0$), ($c_1$) and ($c_2$) are respectively generated by the generator functions $g_0$, $g_1$, and g2. The code symbols are output from encoder 22 to block interleaver 24. The output code symbols are provided to interleaver 24 in the order of the code symbol ($c_0$) being first, the code symbol ($c_1$) being second and the code symbol ($c_2$) being last. The state of the encoder 22, upon initialization, is the all-zero state. Furthermore, the use of tail bits at the end of each frame provides a resetting of encoder 22 to an all-zero state.

The symbols output from encoder 22 are provided to block interleaver 24 which under the control of microprocessor 18 provides a code symbol repetition. Using a conventional random access memory (RAM) with the symbols stored therein as addressed by microprocessor 18, code symbols may be stored in a manner to achieve a code symbol repetition rate that varies with the data channel.

In a more expedient and preferred implementation the microprocessor 18 need not be burdened with data interleaver control responsibility. In the preferred implementation microprocessor 18 only needs to provide the rate information signals along with the frame data to encoder 22. Using the rate information, encoder 22 controls the rate at which encoder symbols are generated. Interleaver 24 includes logic which internally addresses the memory locations at a constant rate. Encoder 22 encodes data at less than full rate and at a slower rate such that the encoded symbols are stored in multiple locations in interleaver 24.

In either implementation, code symbols are not repeated for the 9.6 kbps data rate. Each code symbol at the 4.8 kbps data rate is repeated 1 time, i.e. each symbol occurs 2 times. Each code symbol at the 2.4 kbps data rate is repeated 3 times, i.e. each symbol occurs 4 times. Each code symbol at the 1.2 kbps data rate is repeated 7 times, i.e. each symbol occurs 8 times. For all data rates (9.6, 4.8, 2.4 and 1.2 kbps), the code repetition results in a constant code symbol rate of 28,800 code symbols per second for the data as output from interleaver 24. On the reverse traffic channel the repeated code symbols are not transmitted multiple times with all but one of the code symbol repetitions deleted prior to actual transmission due to the variable transmission duty cycle as discussed in further detail below. It should be understood that the use of code symbol repetition is an expedient method for describing the operation of the interleaver and a data burst randomizer as discussed in further detail below. It should be further understood that implementations other than those that use code symbol repetition may be readily devised to achieve the same result and remain within the teaching of the present invention.

All code symbols to be transmitted on the reverse traffic channel and the access channel are interleaved prior to modulation and transmission. Block interleaver 24, constructed as is well known in the art, provides an output of the code symbols over a time period spanning 20 msec. The interleaver structure is typically a rectangular array with 32 rows and 18 columns, i.e. 576 cells. Code symbols are written into the interleaver 24 by columns, with repetition for data at the 4.8, 2.4 and 1.2 kbps rate, so as to completely fill the 32 by 18 matrix. FIGS. 5a–5d illustrate the ordering of write operations of original and repeated code symbols into the interleaver array for transmission data rates of 9.6, 4.8, 2.4 and 1.2 kbps, respectively.

Reverse traffic channel code symbols are output from the interleaver by rows. Microprocessor 18 also controls the addressing of the interleaver memory for outputting the symbols in the appropriate order. Again, in an alternate and preferred implementation microprocessor 18 is relieved from interleaver addressing responsibilities. In this implementation the interleaver again uses the internal addressing logic to provide an output of the stored symbols in the appropriate order. The interleaver stored symbols are preferably output in the following row order:

At 9.6 kbps:
1 2 3 4 5 6 7 8 9 10 11 12 13 14 15 16 17 18 19 20 21 22 23 24 25 26 27 28 29 30 31 32

At 4.8 kbps:
1 3 2 4 5 7 6 8 9 11 10 12 13 15 14 16 17 19 18 20 21 23 22 24 25 27 26 28 29 31 30 32

At 2.4 kbps:
1 5 2 6 3 7 4 8 9 13 10 14 11 15 12 16 17 21 18 22 19 23 20 24 25 29 26 30 27 31 28 32

At 1.2 kbps:
1 9 2 10 3 11 4 12 5 13 6 14 7 15 8 16 1 7 25 18 26 19 27 20 28 21 29 22 30 23 31 24 32.

Access channel code symbols are also output from interleaver 24 by rows in the appropriate order using the techniques discussed above. The interleaver stored symbols are output in the following row order at the 4.8 kbps rate for the access channel code symbols:

1 17 9 25 5 21 13 29 3 19 11 27 7 23 15 31 2 18 10 26 6 22 14 30 4 20 12 28 8 24 16 32.

It should be noted that other encoding rates, such as a rate ½ convolutional code used on the forward transmission channel, along with various other symbol interleaving formats may be readily devised using the basic teaching of the present invention.

Referring again to FIG. 1, the interleaved code symbols are output from interleaver 24 to modulator 26. In the preferred embodiment, modulation for the Reverse CDMA Channel uses 64-ary orthogonal signaling. That is, one of 64 possible modulation symbols is transmitted for each six code symbols. The 64-ary modulation symbol is one of 64 orthogonal waveforms generated preferably using Walsh functions. These modulation symbols are given in FIGS. 6a, 6b, and 6c, and are numbered 0 through 63. The modulation symbols are selected according to the following formula:

$$\text{Modulation symbol number} = c_0 + 2c_1 + 4c_2 + 8c_3 + 16c_4 + 32c_5 \quad (3)$$

where $C_5$ shall represent the last or most recent and $c_0$ the first or oldest binary valued ('0' and '1') code symbol of each group of six code symbols that form a modulation symbol. The period of time required to transmit a single modulation symbol is referred to as a 'Walsh symbol' interval and is approximately equal to 208.333 ms. The period of time associated with one-sixty-fourth of the modulation symbol is referred to as a 'Walsh chip' and is approximately equal to 3.2552083333. . . ms.

Each modulation or Walsh symbol is output from modulator 26 to one input of a modulo-2 adder, exclusive-OR gate 28. The Walsh symbols are output from modulator 26 at a 4,800 sps rate which corresponds to a Walsh chip rate of 307.2 kcps. The other input to gate 28 is provided from long code generator 30 which generates a pseudo-noise or pseudo-random (PN) code, referred to as the long code sequence, in cooperation with mask circuit 32. The long code sequence provided from generator 30 is at a chip rate four times the Walsh chip rate of modulator 26, i.e. a PN chip rate 1.2288 Mcps. Gate 28 combines the two input signals to provide an output of spread data at the chip rate of 1.2288 Mcps.

The long code sequence is a time shift of a sequence of length $2^{42}-1$ chips and is generated by a linear generator well known in the art using the following polynomial:

$$p(x) = x^{42} + x^{35} + x^{33} + x^{31} + x^{27} + x^{26} + x^{25} + x^{22} + x^{21} + x^{19} + x^{18} + x^{17} + x^{16} + x^{10} + x^7 + x^6 + x^5 + x^3 + x^2 + x^1 + 1 \quad (4)$$

Figure 7:
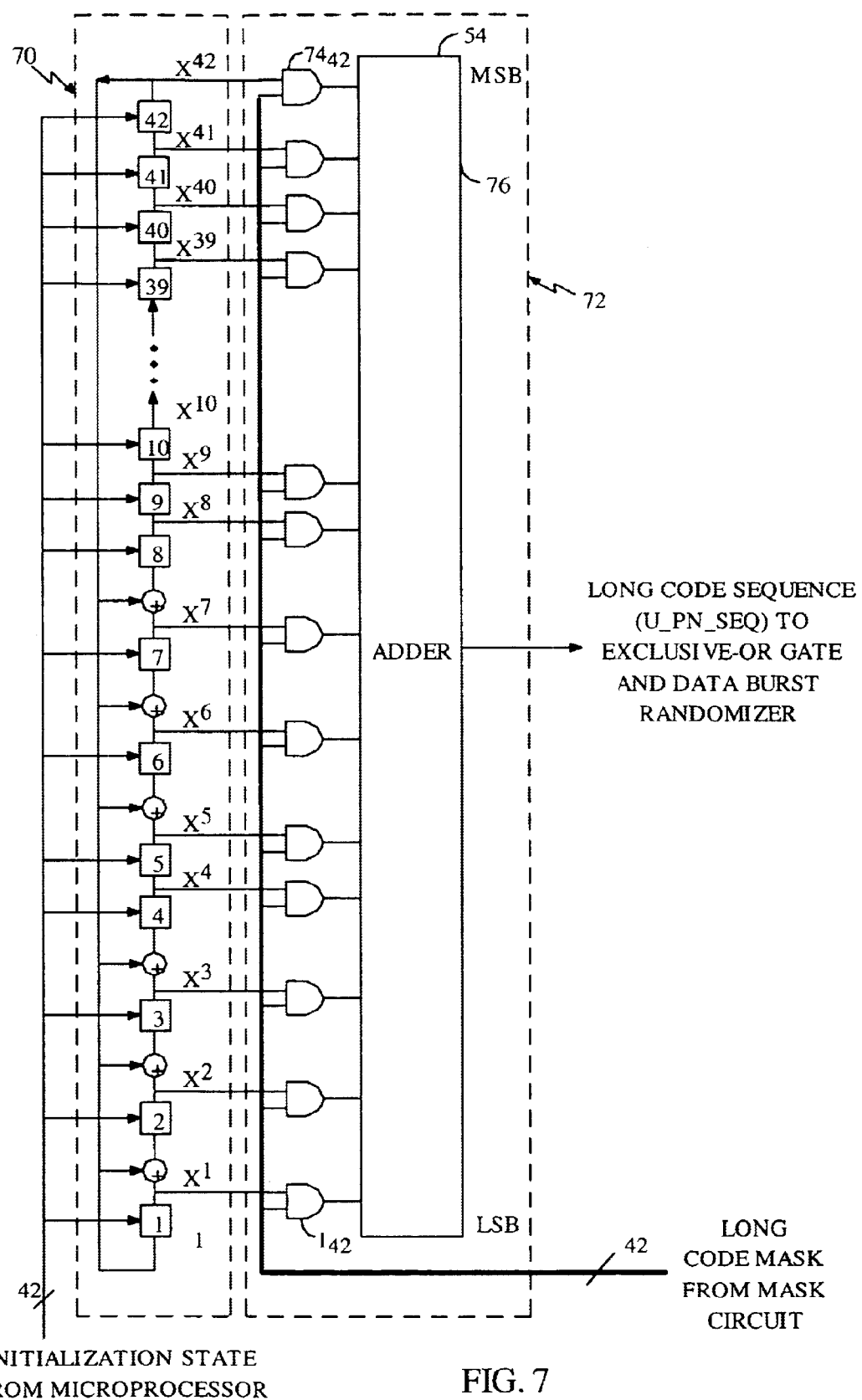
FIG. 7 is a block diagram illustrating the long code generator of FIG. 1.

FIG. 7 illustrates generator 30 in further detail. Generator 30 is comprised of sequence generator section 70 and masking section 72. Section 70 is comprised of a sequence of shift registers and modulo-2 adders (typically exclusive-OR gates) coupled together to generate a 42-bit state variables according to equation 4. The 42-bit state variables output from section 70 are provided to section 72 along with a 42-bit wide mask provided from mask circuit 32.

Section 72 is comprised of a series of input AND gates $74_1$–$74_{42}$ having one input for receiving a respective one of the 42 state variable bits. The other input of each of AND gates $74_1$–$74_{42}$ receives a respective one of the 42 mask bits. The output of AND gates $74_1$–$74_{42}$ are then modulo-2 added by adder 76 so as to form a single bit output from section 72 for each 1.2288 Mhz clocking of the shift registers of section 70. Adder 76 is typically constructed as a cascaded arrangement of exclusive-OR gates as is well known in the art. Therefore, the actual output PN sequence U_PN_SEQ is generated by the modulo-2 addition of the masked output bits of section 70.

Figure 8A:
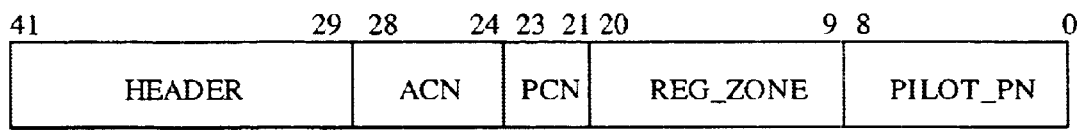
FIGS. 8a–8c are a series of diagrams illustrating long code masks for the various channel types.
Figure 8B:
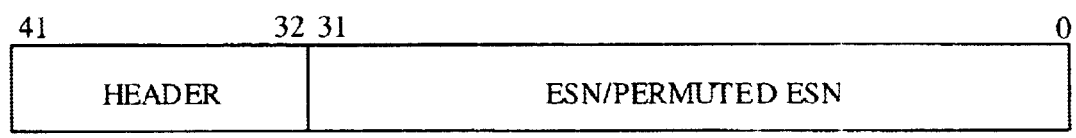
Figure 8C:
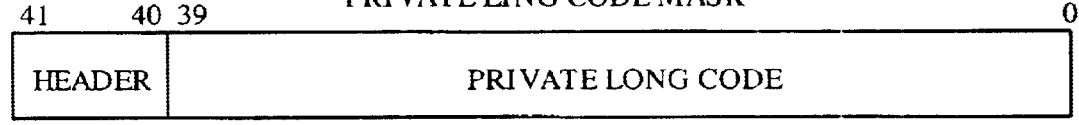

The mask used for the PN spreading varies depending on the channel type on which the mobile station is communicating. Referring back to FIG. 1, initialization information is provided from microprocessor 18 to generator 30 and circuit 32. Generator 30 is responsive to the initialization information for initialization of the circuitry. Circuit 32 is also responsive to the initialization information, which also indicates the type of mask to be provided by circuit 32 to generator 30. As such, mask circuit 32 may be configured as a memory which contains a 42-bit mask for each communication channel type. FIGS. 8*a*–8*c* provide an exemplary definition of the masking bits for each channel type.

Specifically, when communicating on the access channel, the mask is defined as illustrated in FIG. 8*a*. In the access channel mask, mask bits $M_{29}$ through $M_{41}$, are mask header bits; mask bits $M_{24}$ through $M_{28}$ are bits indicative of the access channel number (ACN); mask bits $M_{21}$ through $M_{23}$ are bits indicative of the code channel for the associated paging channel, i.e., paging channel number (PCN), with the range typically being 1 through 7; mask bits $M_9$ through $M_{20}$ are bits indicative of the registration zone (REG_ZONE); and mask bits $M_0$ through $M_8$ are bits indicative of the pilot PN offset (PILOT_PN) for the current base station.

When communicating on the reverse traffic channel, the mask is defined as illustrated in FIGS. 8*b* and 8*c*. The mobile station uses one of two long codes unique to that mobile station: a public long code which is a function of the mobile station's electronic serial number (ESN); and a private long code unique for each mobile identification number (MIN) which is typically the telephone number of the mobile station.

In the public long code, FIG. 8*b*, mask bits $M_{32}$ through $M_{41}$, are header bits; and mask bits $M_0$ through M31, are bits set as a one-to-one function of the mobile station ESN. Thus these bits may either directly correspond to the ESN or a permuted version thereof. In the private long code the mask bits $M_{40}$ through M41, are header bits; and mask bits $M_0$ through $M_{39}$ correspond to bits set according to a predetermined assignment scheme.

It is envisioned that the private long code be implemented as illustrated in FIG. 8*c*, although other masking codes may be generated. The private long code will provide additional security to the data transmissions in that it will only be known to the base station and the mobile station. The private long code preferably will not be transmitted over the transmission medium.

Referring back to FIG. 1 the output of gate 28 is respectively provided as one input to each one of a pair of modulo-2 adders, exclusive-OR gates 34 and 36. The other input to each of gates 34 and 36 are respectively second and third PN sequences, I and Q channel 'short codes', respectively generated by I and Q Channel PN generators 38 and 40. The reverse access channel and reverse traffic channel is therefore offset quadrature phase shift key (OQPSK) spread prior to actual transmission. This offset quadrature spreading on the reverse channel uses the same I and Q PN codes as are used in the cell base station to mobile station communication, i.e. the forward channel.

The I and Q PN codes generated by generators 38 and 40 are of length $2^{15}$ and are preferably zero-time offset codes with respect to the forward channel. For purposes of further understanding, on the forward channel a pilot signal is generated for each base station. Each base station pilot channel signal is spread by the I and Q PN codes as described with respect to the mobile station. The I and Q PN codes of a base station are together offset from those of another base station. By shifting both code sequences transmissions by different base stations may be distinguished. The generating functions for the I and Q short PN codes are be as follows:

$$P_I(x)=x^{15}+x^{13}+x^9+x^8+x^7+x^5+1 \quad (5)$$

and $$P_Q(x)=x^{15}+x^{12}+x^{11}+x^{10}+x^6+x^5+x^4+x^3+1 \quad (5)$$

Generators 38 and 40 may be constructed so as to provide an output sequence in accordance with equations (5) and (6).

The I and Q waveforms are output from gates 34 and 36 and provided as inputs to finite impulse response (FIR) filters 42 and 44. FIR filters 42 and 44 are digital filters which bandlimit the resulting I and Q waveforms. These digital filters shape the I and Q waveforms such that the resulting spectrum is contained within a given frequency spectrum. The digital filters preferably have the impulse response shown in Table II below.

Figure 9:
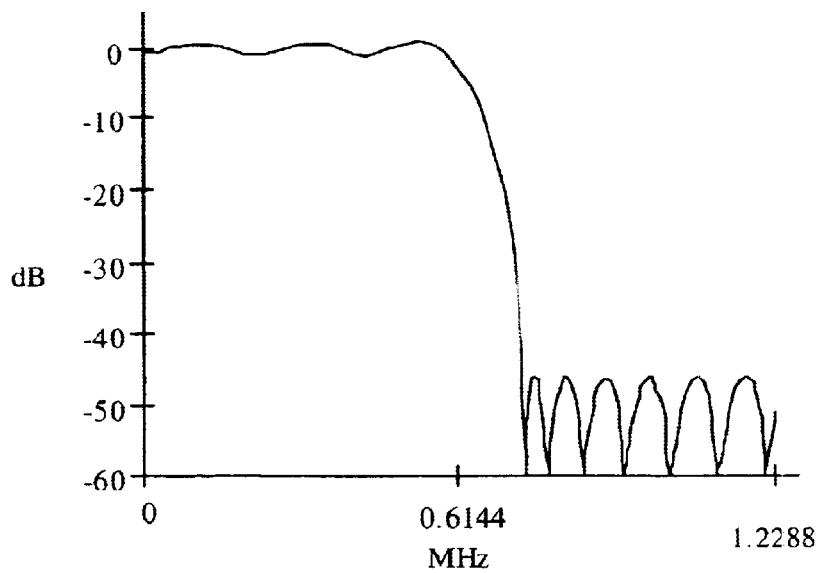
FIG. 9 is a graph illustrating the frequency response of the digital filters of FIG. 1.

Filters 42 and 44 may be constructed according to well known digital filter techniques and preferably provide a frequency response as illustrated in FIG. 9. However exemplary preferred implementations of filters 42 and 44 are described later herein.

TABLE II

| | | |
|---|---|---|
| h(0) = | −0.025288315 = | h(47) |
| h(1) = | −0.034167931 = | h(46) |
| h(2) = | −0.035752323 = | h(45) |
| h(3) = | −0.016733702 = | h(44) |
| h(4) = | 0.021602514 = | h(43) |
| h(5) = | 0.064938487 = | h(42) |
| h(6) = | 0.091002137 = | h(41) |
| h(7) = | 0.081894974 = | h(40) |
| h(8) = | 0.037071157 = | h(39) |
| h(9) = | −0.021998074 = | h(38) |
| h(10) = | −0.060716277 = | h(37) |
| h(11) = | −0.051178658 = | h(36) |
| h(12) = | 0.007874526 = | h(35) |
| h(13) = | 0.084368728 = | h(34) |
| h(14) = | 0.126869306 = | h(33) |
| h(15) = | 0.094528345 = | h(32) |
| h(16) = | −0.012839661 = | h(31) |
| h(17) = | −0.143477028 = | h(30) |
| h(18) = | −0.211829088 = | h(29) |
| h(19) = | −0.140513128 = | h(28) |
| h(20) = | 0.094601918 = | h(27) |
| h(21) = | 0.441387140 = | h(26) |
| h(22) = | 0.785875640 = | h(25) |
| h(23) = | 1.0 = | h(24) |

The binary '0' and '1' inputs to digital filters 42 and 44, generated by the N spreading functions, are mapped into +1 and −1, respectively. The sampling frequency of the digital filter is 4.9152 Mhz =4 ×1.2288 Mhz. An additional binary '0' and '1' input sequence synchronous with the I and Q digital waveforms are provided to each of digital filters 42 and 44. This particular sequence, referred to as a masking sequence, is the output generated by a data burst randomizer. The masking sequence multiplies the I and Q binary waveforms to produce a ternary input of (−1, 0, and +1) to digital filters 42 and 44.

As discussed previously the data rate for transmission on the reverse traffic channel is at one of the rates of 9.6, 4.8, 2.4, or 1.2 kbps and varies on a frame-by-frame basis. Since the frames are of a fixed 20 msec. length for both the access channel and the reverse traffic channel, the number of information bits per frame shall be 192, 96, 48, or 24 for transmission at data rates of 9.6, 4.8, 2.4, or 1.2 kbps, respectively. As described previously, the information is encoded using a rate ⅓ convolutional encoder. The code symbols are repeated to provide a constant code symbol rate of 28,800 symbols per second (sps). This 28,800 sps stream is block interleaved as previously described.

Prior to transmission, the Reverse Traffic Channel interleaver output stream is gated with a time filter that allows transmission of certain interleaver output symbols and deletion of others. The duty cycle of the transmission gate thus varies with the transmit data rate. When the transmit data rate is 9.6 kbps, the transmission gate allows all interleaver output symbols to be transmitted. When the transmit data rate is 4.8 kbps, the transmission gate allows one-half of the interleaver output symbols to be transmitted, and so forth. The gating process operates by dividing the 20 msec. frame into 16 equal length (i.e., 1.25 msec.) periods, called power control groups. Certain power control groups are gated on (i.e., transmitted), while other groups are gated off (i.e., not transmitted).

The assignment of gated-on and gated-off groups is referred to as a data burst randomizer function. The gated-on power control groups are pseudo-randomized in their positions within the frame so that the actual traffic load on the reverse CDMA channel is averaged, assuming a random distribution of the frames for each duty cycle. The gated-on power control groups are such that every code symbol input to the repetition process shall be transmitted once. During the gated-off periods, the mobile station does not transmit energy, thus reducing the interference to other mobile stations operating on the same reverse CDMA channel. This symbol gating occurs prior to transmission filtering.

The transmission gating process is not used when the mobile station transmits on the access channel. When transmitting on the access channel, the code symbols are repeated once (each symbol occurs twice) prior to transmission.

In the implementation of the data burst randomizer function, data burst randomizer logic 46 generates a masking stream of 0's and 1's that randomly masks out the redundant data generated by the code repetition. The masking stream pattern is determined by the frame data rate and by a block of 14 bits taken from the long code sequence generated by generator 30. These mask bits are synchronized with the data flow and the data is selectively masked by these bits through the operation of the digital filters 42 and 42. Within logic 46 the last 14 bits occurring in the next-to-last power control group of each reverse traffic channel frame boundary are stored. Logic 46 uses this data along with the rate input from microprocessor 18, to determine, according to a predetermined algorithm, the particular power control groups in which the data is to be allowed to pass through filters 42 and 42 for transmission. Logic 46 thus outputs for each power control group a '1' or '0' for the entire power control group depending on whether the data is to be filtered out or passed through. At the corresponding receiver, which also uses the same long code sequence and a corresponding rate determined for the frame, logic is provided which determines the appropriate power control groups in which the data is present.

The 14 bits of the long code sequence stored in logic 46 used in determining the power control groups in which data is present for transmission is identified as follows:

$b_0\ b_1\ b_2\ b_3\ b_4\ b_5\ b_6\ b_7\ b_8\ b_9\ b_{10}\ b_{11}\ b_{12}\ b_{13}$, where $b_0$ represents the oldest generated bit in the 14-bit sequence, and $b_{13}$ represents the most recently generated bit in the 14-bit sequence.

Each 20 msec. reverse traffic channel frame is divided into 16 equal length (i.e., 1.25 msec.) power control groups numbered from 0 to 15 as shown in FIGS. 10*a*–10*d*. Data burst randomizer logic 46 implements an algorithm which permits data to be transmitted for the various power control groups for the various rates. It should be noted that in order to randomize the position of the data within the transmission frame, only 8 bits are necessary. However as disclosed herein, 14-bits are used to assure that the slot position within the frame (power control group) for data transmission at quarter rate is a subset of the slots (power control groups) used at the half rate and that the slots used for data transmission at eighth rate is a subset of the slots used at the quarter rate.

Figure 10:
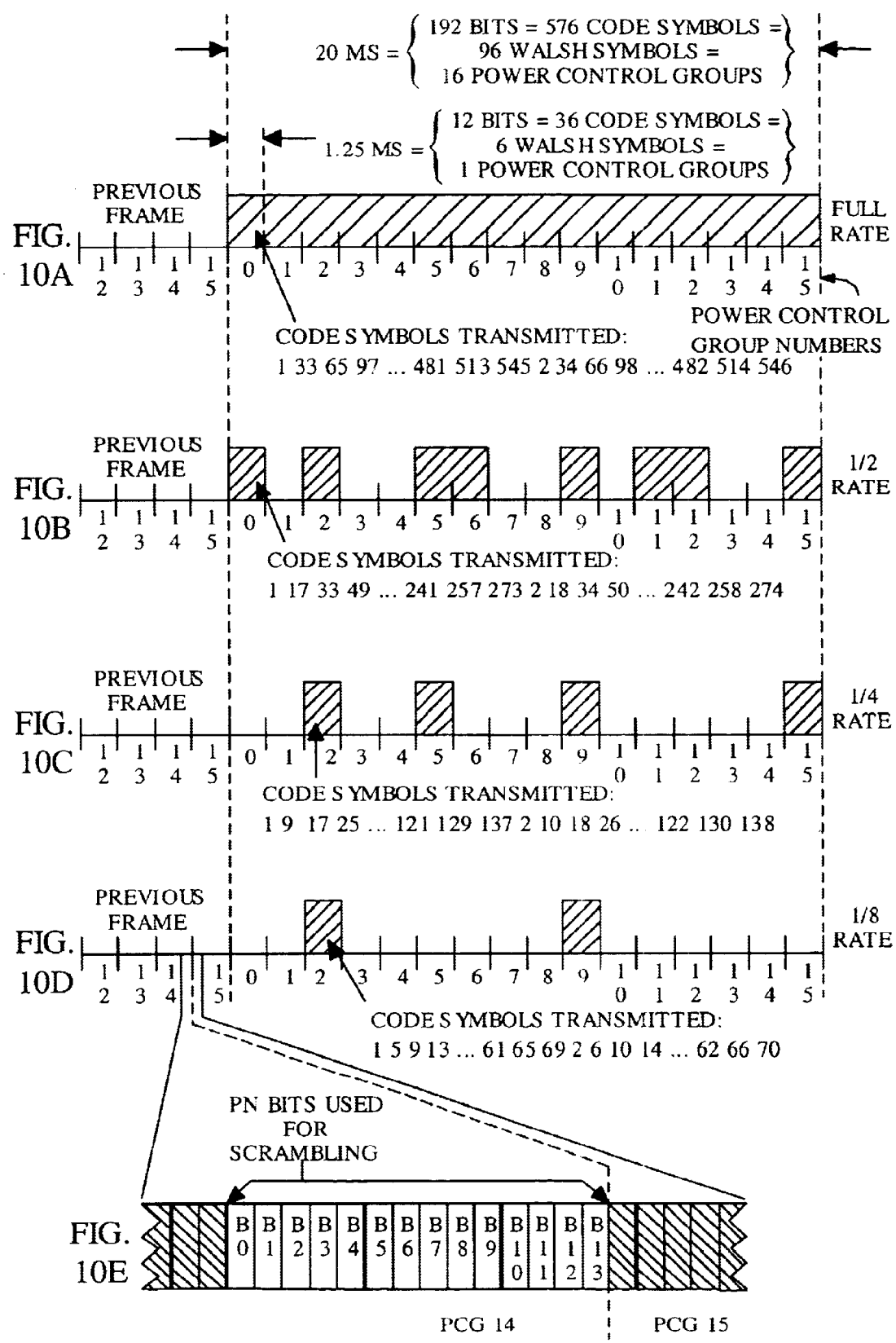

FIG. 10*e* illustrates that the 14 bits from the masked long code that are stored correspond to the last 14 bits of the 15th power control group (PCG 14) of the 16 power control group of the preceding frame. The 15th power control group is used to provide sufficient time to determine the power control groups in which data is transmitted in the following frame. However it should be understood that any predetermined bits of PN data could be used in determining the power control groups of the current frame for data transmission. Although it is desirable to use the long code sequence in determining the power control groups in which data transmission is to occur, since this sequence is also used at the receiver for PN, other deterministic sequences may be used for power control group determination. In this instance any other deterministic sequence may be used which is also know by the receiver. Thus the sequence used in computing the power control groups may be independent of the sequence used to PN spread the user data.

As illustrated in FIGS. 10*a*–10*d* within the 1.25 msec. time period of each transmitted power control group within the frame there are 12 data bits encoded as 36 code symbols which are in turn encoded as 6 Walsh symbols. With each Walsh symbol represented by 64 Walsh chips there are 384 Walsh chips within the 1.25 msec. time period. Since there are 4 PN chips for every Walsh chip, each transmitted power control group is comprised of data modulated by 1536 PN chips.

For full rate data, data is transmitted in each power control group. However, for rates less than full rate, the value of the selected bits $b_0$–$b_{13}$ is used to determine the power control groups in which data is transmitted. The power control groups used for transmission for the various rates are as follows:

Data Rate Selected—Full Rate

Transmission shall occur on power control groups numbered:

0,1,2,3,4,5,6,7,8,9,10,11,12,13,14,15.

Data Rate Selected—Half Rate

Transmission shall occur on eight power control groups numbered:

$b_0$, $2+b_1$, $4+b_2$, $6+b_3$, $8+b_4$, $10+b_5$, $12+b_6$, and $14+b_7$.

Data Rate Selected—Quarter Rate

Transmission shall occur on four power control groups numbered:

$b_0$ if $b_8=0$ or $2+b_1$ if $b_8=1$;
$4+b_2$ if $b_9=0$ or $6+b_3$ if $b_9=1$;
$8+b_4$ if $b_{10}=0$ or $10+b_5$ if $b_{10}=1$; and
$12+b_6$ if ($b_{11}=0$ or $14+b_7$ if $b_{11}=1$.

Data Rate Selected—One-Eighth Rate

Transmission shall occur on two power control groups numbered:

$b_0$ if ($b_8=0$ and $b_{12}=0$), or $2+b_1$ if ($b_8=1$ and $b_{12}=0$ or $4+b_2$ if ($b_9=0$ and $b_{12}=1$), or $6+b_3$ if ($b_9=1$ and $b_{12}=1$); and $8+b_4$ if ($b_{10}=0$ and $b_{13}=0$), or $10+b_5$ if ($b_{10}=1$ and $b_{13}=0$) $12+b_6$ if ($b_{11}=0$ and $b_{13}=1$), or $14+b_7$ if ($b_{11}=1$ and $b_{13}=1$).

FIGS. 10a–10d, in conjunction with FIG. 10e, illustrate by example the power control groups selected for the various rates for an exemplary $b_0$—$b_{13}$ bit sequence. It should be understood that since data for each frame is transmitted at only one rate in the actual implementation, data would be transmitted according to only one of FIGS. 10a–10d for the particular frame. In the example illustrated in FIGS. 10a–10e, an exemplary $b_0$—$b_{13}$ bit sequence of (0, 0, 1, 0, 1, 1, 0, 1, 1, 0, 0, 1, 0, 0) is used. Using the algorithms set forth above for each data rate, data would be transmitted in the power control groups shaded for the corresponding transmission rate. As can be seen in FIGS. 10b–10d, the selected power control groups of the lower rates are subsets of selected power control groups of higher rates. The use of subsets provides for ease in decoding of the frame for each of the various rates.

Logic 46 also generates an output TX_PUNCT signal to the RF transmitter circuit 58. This signal is used to turn on the transmitter power amplifier for power control groups that are to be transmitted and off for power control groups that are not transmitted. This control over the power amplifier provides a reduction in power consumption by the transmitter, which is particularly important in portable units. Further details of data burst randomizer logic 46 are provided in U.S. patent application Ser. No. 08/291,231, now U.S. Pat. No. 5,535,239, entitled "DATA BURST RANDOMIZER," which is assigned to the assignee of the present invention and which is incorporated herein by reference.

II. Interference Reduction Techniques

In the data burst randomizer described above, the gated-on power control groups are pseudo-randomized in their positions within the frame, spreading the burst-induced AM interference over a relatively wide bandwidth. The present invention contemplates a number of techniques for reducing the interference experienced by users of CDMA communication devices. In the present invention, interference arising from variable-rate transmission is effectively eliminated by configuring the transmitter of an authorized CDMA communication unit to transmit RF energy substantially continuously at a full-rate power level, irrespective of the instantaneous level of user speech or data activity. This continuous transmission is accomplished by the communication unit transmitting only full rate frames. As a consequence, the type of AM interference nominally accompanying the transmission of variable-rate data by a CDMA transmitter is substantially eliminated.

Figure 11:
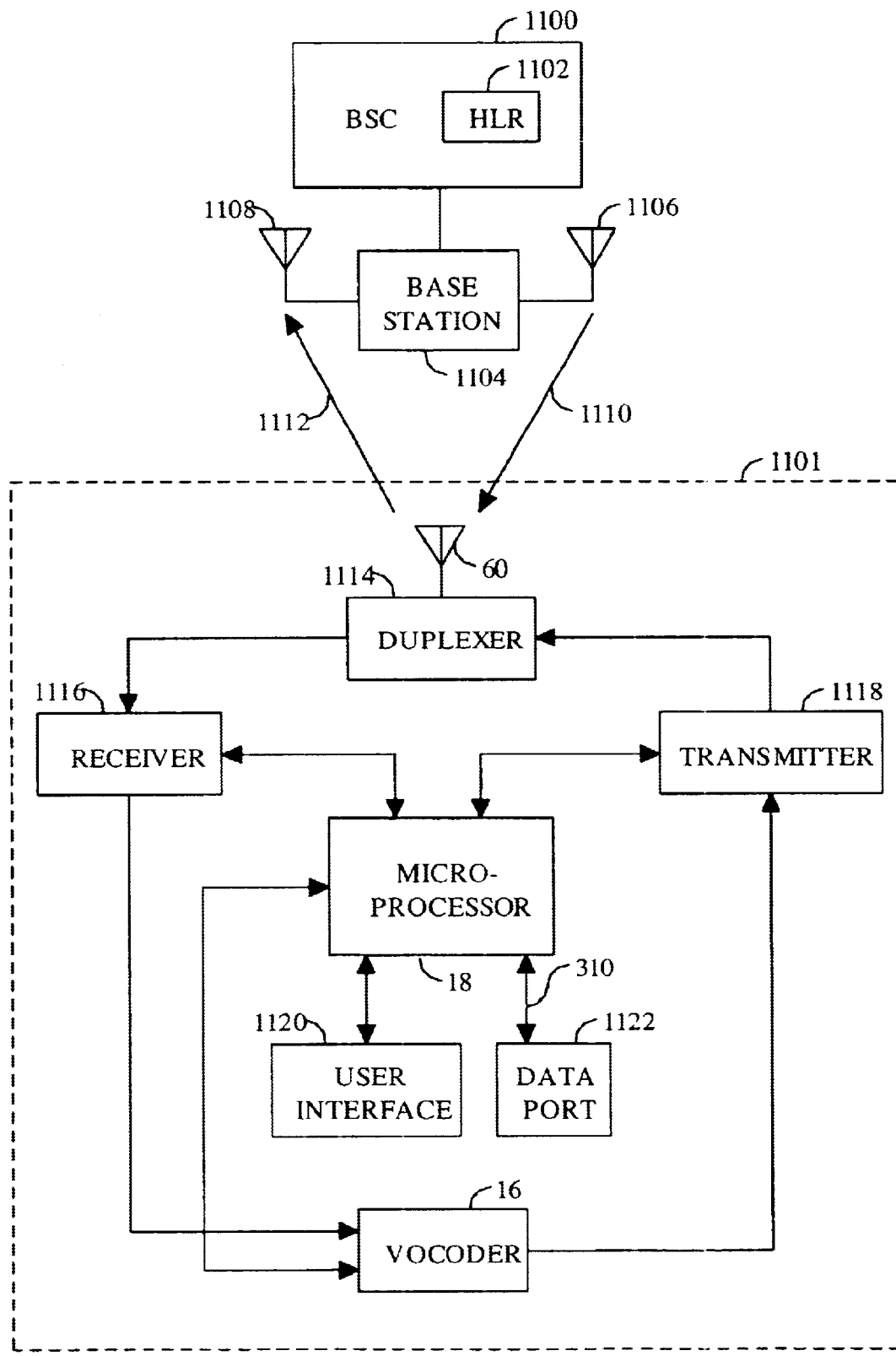
FIG. 11 is an illustration, in block diagram, of selected portions of a communication system capable of operation in the reduced interference mode of the present invention.

FIG. 11 illustrates selected portions of a CDMA communication system capable of operating in the reduced interference mode of the present invention. Communication unit 1101 is shown to be in communication with base station 1104, which is controlled by base station controller (BSC) 1100. BSC 1100 contains a home location register (HLR) database 1102 containing the account profiles of all subscribers in the service area controlled by BSC 1100. Base station 1104 radiates RF signals through antenna 1106 to communication unit 1101 on the forward link 1110. Base station 1104 also receives RF signals, through antenna 1108, which have been transmitted by communication unit 1101 over reverse link 1112.

The present invention is believed to be of particular benefit to hearing impaired users of digital communications devices. Since such users will often be reliant upon electronic hearing aids, the reduced interference levels associated with operation in accordance with the invention minimizes any impact upon hearing aid operation. In order to manage system capacity, a number of authorization schemes may be instituted as a means of ensuring that only those CDMA communication units 1101 associated with selected eligible users (e.g., hearing impaired users) are permitted to engage in the type of reduced interference transmission contemplated by the invention.

For example, only eligible hearing impaired users could be allowed to purchase CDMA communication units 1101 pre-authorized for operation in a reduced interference mode. Alternately, eligible hearing impaired users could obtain authorization from their cellular service provider after purchase of a CDMA communication unit 1101 capable of reduced interference mode operation. The authorization information may conveniently reside with the rest of the subscriber's account profile in the subscriber's home location register (HLR) 1102.

Once authorized, the reduced interference mode could be activated in a number of ways. For example, the user may activate the reduced interference mode through user interface 1120, which may comprise a keypad and associated circuitry as is known in the art. In such a case, the user would enter a predetermined activation sequence through user interface 1120, which would provide a reduced interference mode activation signal to microprocessor 18. In response, microprocessor 18 would then configure communication unit 1101 for operation in the reduced interference mode. Deactivation of the reduced as interference mode could be accomplished in a similar fashion. In this example, the user would be able to activate and deactivate the reduced interference mode at will.

For even greater security, the reduced interference mode may be activated and deactivated through dataport 1122 by the subscriber's service provider. Typically, this would involve connecting the communication unit 1101 to a programming station, such as a computer (not shown). In such a case, the reduced interference mode activation signal generated by the computer would be passed from dataport 1122 to microprocessor 18 over transmission line 310, and microprocessor 18 would then configure communication unit 1101 for reduced interference mode operation. Optionally, a service programming code could be required to activate the reduced interference mode over dataport 1122 in order to prevent unauthorized activation.

In yet another activation technique, authorized communication units 1101 could request and receive over-the-air activation from the cellular service provider operating BSC 1100. In this case, the user would enter an appropriate request sequence into user interface 1120. In response, microprocessor 18 would generate appropriate signaling bits, multiplex them into a frame, and pass the frame to transmitter 1118 for transmission over reverse link 1112 to base station 1104. Base station 1104 would then pass the request to BSC 1100 which would verify authorization in the subscriber's HLR 1102. Upon appropriate authorization, base station 1104 would then transmit a reduced interference mode activation signal to communication unit 1101. The reduced interference mode activation signal transmitted by base station 1104 would be received by antenna 60 and passed to receiver 1116 by duplexer 1114. Receiver 1116 would demodulate and decode the activation signal and pass it to microprocessor 18. In response, microprocessor 18 would then configure communication unit 1101 for operation in the reduced interference mode. Additionally, when "roving" outside of a home service area, the communication unit 1101 could be permitted several unauthorized uses (e.g., calls) in the visited service area pending receipt of authorization from the home service area HLR 1102.

Communication unit 1101 may be configured for reduced interference mode operation by microprocessor 18 in response to the reduced interference mode activation signal generated by any of the above techniques. It should be noted that the above described techniques are merely exemplary, and other activation techniques may be used.

Once the reduced interference mode is activated, communication unit 1101 is ready to operate in reduced interference mode. To do so, microprocessor 18 generates a signaling message which is transmitted to base station 1104 indicating the communication unit's 1101 intention to transmit in a reduced interference mode. This message may be transmitted, for example, during initial registration with base station 1104, or in an origination message from the communication unit 1101 indicating its attempt to originate a call, or alternatively in a page response message from the communication unit 1101, responding to an incoming page from base station 1104. Specifically, this message indicates the intent of communication unit 1101 to transmit only full rate frames. Assuming proper authorization of communication unit 1101 through HLR 1102, and sufficient system resources available at base station 1104 to support continuous full-rate transmission, base station 1104 will allow the communication unit 1101 to send only full rate frames.

Referring now to FIG. 1, the generation and transmission of full rate frames by communication unit 1101 while in the reduced interference mode will be described. In a first embodiment of the present invention, the microprocessor 18 instructs vocoder 16 to encode each frame of speech samples at full-rate (rate 1) upon receiving the reduced interference mode activation signal. In an exemplary implementation of the first technique, rate 1 transmission corresponds to a data rate from the vocoder 16 to the microprocessor of 8.55 kbps. As noted above, frames of 9.6 kbps are provided by generator 20 during rate 1 operation in response to the frame data assembled by the microprocessor 18. The encoder 22 then encodes the 9.6 kbps data frames from the generator 20 into code symbols without repetition. These code symbols are then interleaved in interleaver 24 and modulated in modulator 26 in the manner described above with reference to FIG. 1.

When the transmit data rate is 9.6 kbps (rate 1), all 16 power control groups within each frame are gated on (i.e., transmitted). As a result of this continuous signal transmission at a full rate, the AM interference nominally associated with transmission of variable rate vocoded speech is substantially eliminated. Optionally, this technique of forcing the vocoder 16 to full-rate operation could be invoked only when the transmit power transmitter 56 exceeded a predetermined threshold, for example 50 mW. In a CDMA system with power control, such a case would normally only occur when the user is near the edge of a base station's cell. As such, the forced full-rate method would have a negligible impact on system capacity due to the relatively infrequency that it would be invoked. Furthermore, invoking the forced full-rate only above a predetermined transmit power level would also preserve battery life in portable communication devices employing the present invention.

In a second embodiment of the present invention, repetitions of non-full rate encoded speech or other data are generated in order to fill the full-rate frame. In the case of voice data, vocoder 16 continues to operate at a variable rate, and microprocessor 18 continues to provide repetition of the power control groups for the half, quarter, and eighth rates as described above. However, the microprocessor 18 instructs data burst randomizer logic 46 to refrain from masking out the redundant power control groups, and transmitter 56 remains gated on for all the power control groups of each frame, in response to the reduced interference mode request. Similarly, microprocessor 18 would generate repetitions of any non-full rate non-vocoder data provided to over data transmission line 310, and instruct data burst randomizer logic 46 to refrain from masking out the redundant power control groups. In each case, microprocessor 18 would instruct transmitter 56 to transmit each frame at a full-rate power level, irrespective of the number of repeated versions of the data. Since the CDMA communication unit thus transmits RF energy substantially continuously at a full rate power level over the entirety of each frame, notwithstanding the data rate, it fails to produce the type of AM interference normally associated with the transmission of variable rate encoded speech and other data.

In a third and preferred embodiment of the present invention, full-rate frames are generated by microprocessor 18 by "padding" the frame as necessary with a predetermined sequence of bits. In the case of speech data, vocoder 16 continues to generate variable rate speech data packets as determined by the level of user speech activity. However, microprocessor 18 builds only full-rate frames by adding signaling traffic bits consisting of a predetermined bit sequence as necessary to pad the frame to a full-rate format. Alternatively, microprocessor 18 could use a predetermined sequence of secondary traffic bits as necessary to pad the frame to a full rate format. As in the case of the previously described embodiments, the microprocessor 18 may be configured to enter this constant full-rate mode only when the transmit power of transmitter 56 exceeds a predetermined threshold, for example, 50 mW.

In this third embodiment, during traffic channel operation the microprocessor 18 ensures that only full-rate frames are transmitted. When building each reverse traffic channel frame, if sufficient bits are not available either from the active service option(s), such as speech or data, or the signaling layer, or both, then the microprocessor 18 generates filler signaling traffic consisting of a predetermined pattern of bits in order to pad out the full rate frame. The preferred predetermined pattern of bits is all zero bits. However, the predetermined pattern of bits could also either be all "ones",or an alternating pattern of ones and zeros, or even a random sequence of bits.

As an example, if only the 8 kbps speech service option is active (i.e. there is no secondary data traffic being passed to microprocessor 18 over transmission line 310), and the level of speech activity is low enough that the vocoder 16 produces a half-rate speech packet, microprocessor 18 would use the multiplex option format shown in FIG. 2b, "Dim and Burst with Rate ½ Primary and Signaling Traffic" to build a full rate frame. The frame would consist of the 80 primary traffic bits comprising the half rate speech packet from vocoder 16, as many of the 88 signaling traffic bits as are needed to accomplish any conventional signaling, and the remainder of the 88 signaling traffic bits would all be set to zero. Likewise, for quarter-rate and eighth-rate speech packets, illustrated in FIGS. 2c and 2d respectively, microprocessor 18 would build frames consisting of 40 primary traffic bits and 16 primary traffic bits respectively, and the remainder of unused 128 or 152 signaling traffic bits respectively, would be set to zero. Again, it should be noted that the present invention is also applicable to other multiplex formats using different numbers of total bits per frame, for example, the 14.4 kbps multiplex format of ANSI J-STD-008 entitled "Personal Station—Base Station Compatibility Requirements for 1.8 to 2.0 Ghz Code Division Multiple Access (CDMA) Personal Communications Systems."

During traffic channel operation, if base station 1104 (See FIG. 11) receives a reverse traffic channel frame containing signaling traffic which consists of all zero bits and which does not form any part of a signaling message, the base station 1104 recognizes that the communication unit 1101 is operating in reduced interference mode and discards the signaling traffic. So in the rate ½ example above, when the base station 1104 receives the frame transmitted by the communication unit 1101, the base station 1104 extracts the 80 bits of primary traffic (i.e., the half-rate speech and/or data packet), and processes them normally. However, then the base station 1104 examines the remaining bits of signaling traffic and, because they are all zero, discards them without further processing. Alternatively, the base station 1104, instead of examining each bit of the signaling traffic to determine if they are all zero, could examine the first N bits of the signaling traffic, where N is the minimum number of bits required to determine whether the signaling traffic is the start of a new signaling message. If these N bits were all zero, and the frame is not part of a reverse traffic channel message that began in an earlier frame, then the base station 1104 would discard the signaling bits as padding. In a system according to IS-95, N would equal eight bits.

An advantage to this third embodiment is that altering the multiplexing scheme in order to produce full-rate frames accommodates both vocoder and non-vocoder data as primary traffic. As such, this third embodiment supports data, fax, packet, and simultaneous voice and data service options. Additionally, this third embodiment allows the base station 1104 to easily detect when a communication unit 1101 is operating in the reduced interference mode by monitoring the reverse link for full rate frames that contain signaling traffic consisting of the predetermined unique pattern of bits. If an unauthorized communication unit 1101 transmits such frames, the base station 1104 can take appropriate action, such as releasing the call.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

We claim:

1. A system for reducing interference generated by a communication device which transmits data at a variable rate and varies transmit power in response to said variable rate, said system comprising:

means for directing said communication device to continuously transmit RF energy at a full rate power level irrespective of said variable rate when said full rate power level exceeds a predetermined threshold; and means, in said communication device and responsive to said means for directing, for transmitting RF energy continuously at said full rate power level irrespective of said variable rate, whereby said interference is reduced proximate said communication device due to continuous transmission thereby at said full rate power level.

2. The system of claim 1 wherein said means for transmitting comprises:

a variable rate vocoder;

a controller for instructing said variable rate vocoder to encode voice data at a full rate; and a transmitter for transmitting said full rate encoded data at said full-rate power level.

3. The system of claim 1 wherein said means for transmitting comprises:

a controller having an input for receiving variable rate data, said controller generating full rate frames of data comprising repeated versions of said variable rate data; and a transmitter for transmitting said full rate frames at said full rate power level.

4. The system of claim 1 wherein said communication device nominally transmits non-full frames of data containing a variable number of bits in response to said variable rate, and wherein said means for transmitting comprises:

a controller for generating full frames of data containing a fixed number of bits irrespective of said variable rate; and a transmitter for transmitting said full frames of data at said full-rate power level.

5. A method for reducing interference generated by a communication device which transmits data at a variable rate and which varies transmit power in response to said variable rate, said method comprising the steps of:

directing said communication device to continuously transmit RF energy at a full rate power level irrespective of said variable rate when said full rate power level exceeds a predetermined threshold; and transmitting, from said communication device and in response to said directing step, RF energy continuously at said full rate power level irrespective of said variable rate, whereby said interference is reduced proximate said communication device due to continuous transmission thereby at said full rate power level.

6. The method of claim 5 wherein said transmitting step further comprises the steps of:

instructing a variable rate vocoder in said communication device to encode voice data at a full rate; and transmitting said full rate encoded data at said full-rate power level.

7. the method of claim 5 wherein said transmitting step further comprises the steps of:

generating full rate frames of data comprising repeated versions of said variable rate data; and transmitting said full rate frames at said full rate power level.

8. The method of claim 5 wherein said communication device nominally transmits non-full frames of data containing a variable number of bits in response to said variable rate, and wherein said transmitting step further comprises the steps of:

generating full frames of data containing a fixed number of bits irrespective of said variable rate; and transmitting said full frames of data at said full-rate power level.

9. A communication device which transmits data at a variable rate and which varies transmit power in response to said variable rate, said system comprising:

a transmitter; and a controller for directing said transmitter to transmit RF energy continuously at a full rate power level irrespective of said variable rate when said full rate power level exceeds a predetermined threshold, whereby said interference is reduced proximate said communication device due to continuous transmission thereby at said full rate power level.

10. The communication device of claim 9 further comprising:
a variable rate vocoder for encoding voice data at a full rate.

11. The communication device of claim 9 wherein said controller has an input for receiving variable rate data, said controller generating full rate frames of data comprising repeated versions of said variable rate data and wherein said transmitter transmits said full rate frames at said full rate power level.

12. The communication device of claim 9 wherein said communication device nominally transmits non-full frames of data containing a variable number of bits in response to said variable rate, and wherein said controller generates full frames of data containing a fixed number of bits irrespective of said variable rate and wherein said transmitter transmits said full frames of data at said full-rate power level.

13. A base station in a communication system in which a plurality of communication devices each transmits data at a variable rate and each which varies transmit power in response to its respective variable rate, said base station comprising:
means for determining if one of said plurality of communication devices is continuously transmitting RF energy at a full rate power level irrespective of a respective variable rate;
means for directing a first of said plurality of communication devices to continuously transmit RF energy at a full rate power level irrespective of said variable rate, whereby interference is reduced proximate said first communication device due to continuous transmission thereby; and
means for receiving said RF energy continuously transmitted by said first communication device.

14. A method for reducing interference generated by a first of a plurality of communication devices each which transmits data at a variable rate and each which varies transmit power in response to its respective variable rate, said method comprising the steps of:
directing a first of said plurality of communication devices to continuously transmit RF energy at a full rate power level irrespective of its respective variable rate when the full rate power level exceeds a predetermined threshold, whereby interference is reduced proximate said first communication device due to continuous transmission thereby; and
receiving said RF energy continuously transmitted by said first communication device.

15. The method of claim 14, further comprising the step of:
determining whether one of said plurality of communication devices is continuously transmitting RF energy at a full rate power level irrespective of its respective variable rate.

16. A system for reducing interference generated by a communication device which transmits data at a variable rate and which varies transmit power in response to said variable rate, said system comprising:
a controller for directing said communication device to continuously transmit RF energy at a full rate power level irrespective of said variable rate when said full rate power level exceeds a predetermined threshold; and a transmitter, in said communication device and responsive to said controller for directing, for transmitting RF energy continuously at said full rate power level irrespective of said variable rate, whereby said interference is reduced proximate said communication device due to continuous transmission thereby at said full rate power level.

17. A base station in a communication system in which a plurality of communication devices transmits data at a variable rate and which varies transmit power in response to said variable rate, said base station comprising:
a controller for directing a first of said plurality of communication devices to continuously transmit RF energy at a full rate power level irrespective of said variable rate when said full rate power level exceeds a predetermined threshold; and
a transmitter, in said communication, whereby interference is reduced proximate said first communication device due to continuous transmission thereby; and
a receiver for receiving said RF energy continuously transmitted by said first communication device.

18. A communication device, comprising:
a variable rate vocoder operable at a plurality of rates including a full rate and at least one rate less than the full rate; and
a transmitter having a power level associated with each of the vocoder rates, the transmitter being configured to transmit data from the variable rate vocoder at the full rate power level irrespective of the vocoder rate when said full rate power level exceeds a predetermined threshold.

19. The communication device of claim 18 wherein the data comprises speech.

20. The communication device of claim 18 wherein the vocoder rate is a function of data activity provided to the variable rate vocoder.

21. The communication device of claim 18 further comprising a controller configured to provide full rate frames of the data to the transmitter irrespective of the vocoder rate.

22. The communication device of claim 21 wherein the controller is further configured to provide the full rate frames of the data to the transmitter by causing the variable rate vocoder to operate at the full rate irrespective of data activity provided to the variable rate vocoder.

23. The communication device of claim 21 wherein the controller is further configured to provide the full rate frames of the data to the transmitter by creating the full rate frames from the data when the variable rate vocoder is operating at one of the rates that is less than the full rate.

24. The communication device of claim 23 wherein the full rate frames of the data created by the controller comprises repeated versions of the data.

25. The communication device of claim 18 wherein the transmitter is configured to transmit the data at the full rate power level irrespective of the vocoder rate in a first mode, and wherein the transmitter is further configured to transmit the data at the power level associated with the vocoder rate in a second mode.

26. The communication device of claim 25 further comprising a user interface configured to activate the first mode.

27. The communication device of claim 25 further comprising a data port configured to activate the first mode.

28. The communication device of claim 25 wherein the controller is further configured to generate a message indicating that the first mode has been activated, and the transmitter is further configured to transmit the message to a remote location.

29. The communication device of claim 28 wherein the controller is further configured to receive a response from the remote location authorizing the communication device to operate in the first mode.

30. The communication device of claim 18 wherein the transmitter is configured to transmit the data at the full rate power level irrespective of the vocoder rate only when the full rate power level exceeds a threshold.

31. A method for reducing interference generated by a communication device, comprising:

operating a variable rate vocoder at one of a plurality of rates including a full rate and at least one rate less than the full rate, each of the rates having a power level associated therewith;

transmitting data from the variable rate decoder at the full rate power level irrespective of the operating rate of the variable rate vocoder when said full rate power level exceeds a predetermined threshold.

32. The method of claim 31 wherein the data comprises speech.

33. The method of claim 31 wherein the operating rate of the variable rate vocoder is a function of data activity provided to the variable rate vocoder.

34. The method of claim 31 wherein the data transmission further comprises transmitting full rate frames of the data irrespective of the operating rate of the variable rate vocoder.

35. The method of claim 34 wherein the operating rate of the variable rate vocoder is the full rate irrespective of data activity provided to the variable rate vocoder.

36. The method of claim 34 wherein the operating rate of the variable rate vocoder is one of the rates that is less than the full rate.

37. The method of claim 36 wherein the full rate frames each comprises repeated versions of the data.

38. The method of claim 31 further comprising activating a mode which causes the data transmission at the full rate power level irrespective of the vocoder rate.

39. The method of claim 38 further comprising generating a message indicating that the mode has been activated, and transmitting the message to a remote location.

40. The method of claim 39 further comprising receiving a response to the message from the remote location.

41. The method of claim 31 wherein the data is transmitted at the full rate power level irrespective of the vocoder rate only when the full rate power level exceeds a threshold.

* * * * *